March 26, 1935.  O. G. SIMMONS  1,995,328

WORM WHEEL GENERATING MACHINE

Filed May 11, 1931  21 Sheets-Sheet 1

INVENTOR

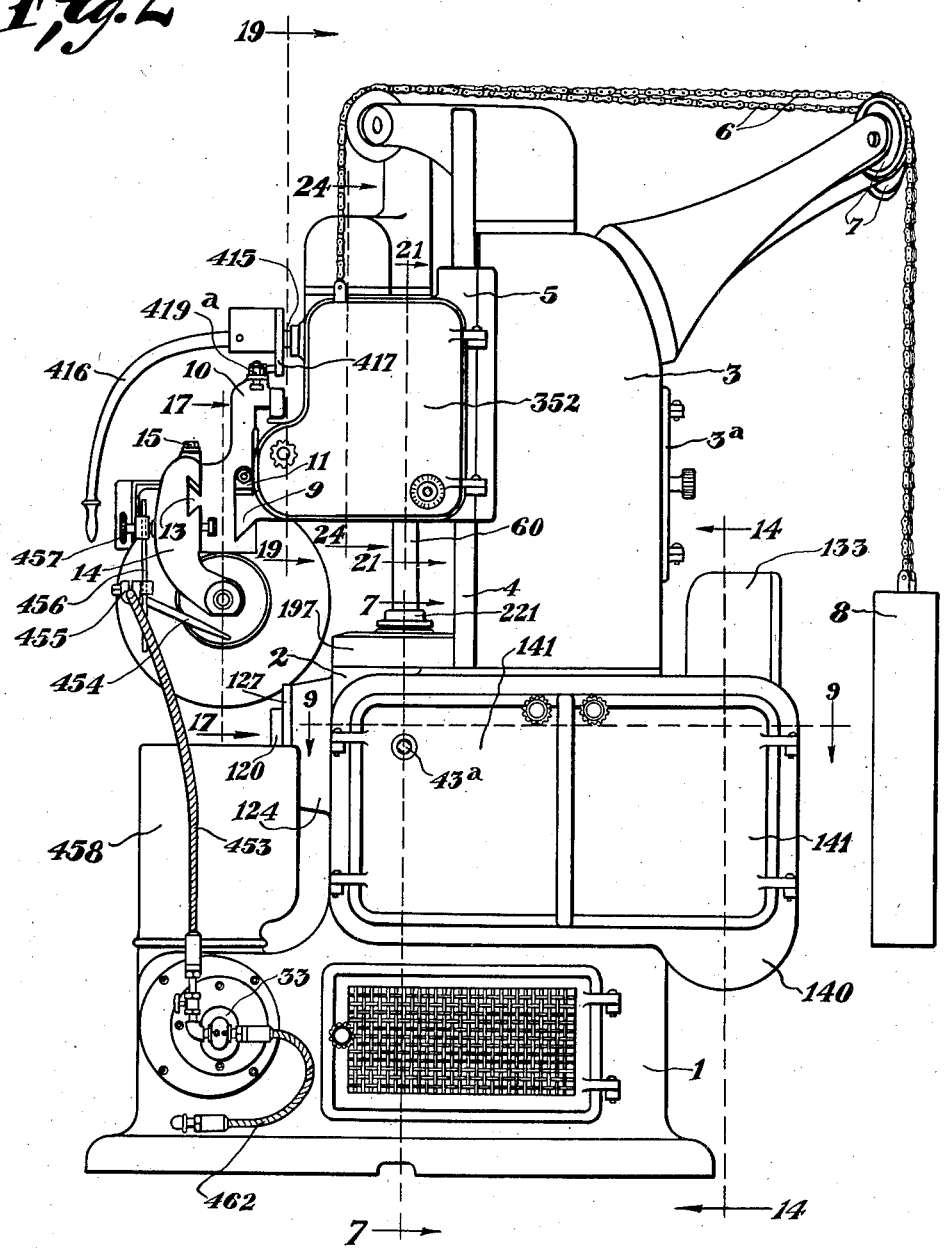

March 26, 1935.  O. G. SIMMONS  1,995,328
WORM WHEEL GENERATING MACHINE
Filed May 11, 1931    21 Sheets-Sheet 3
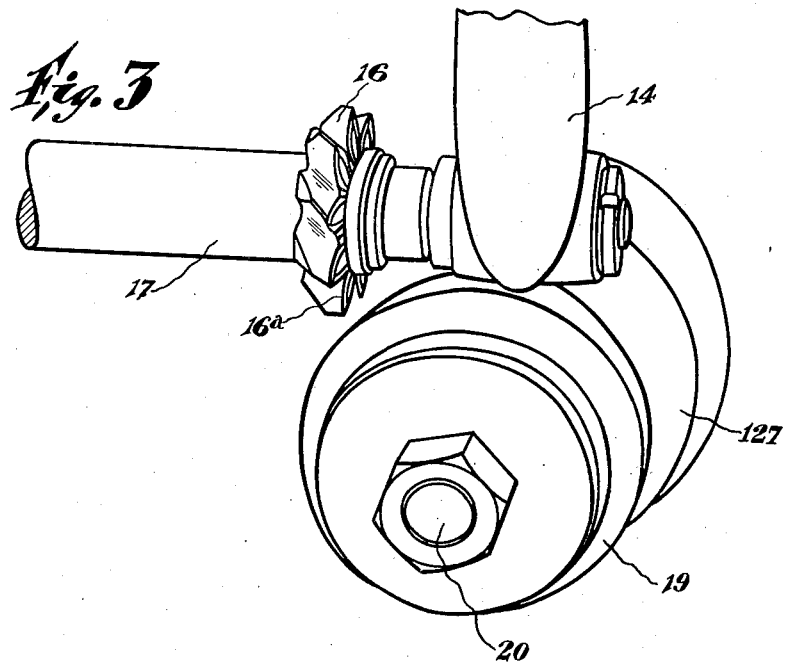
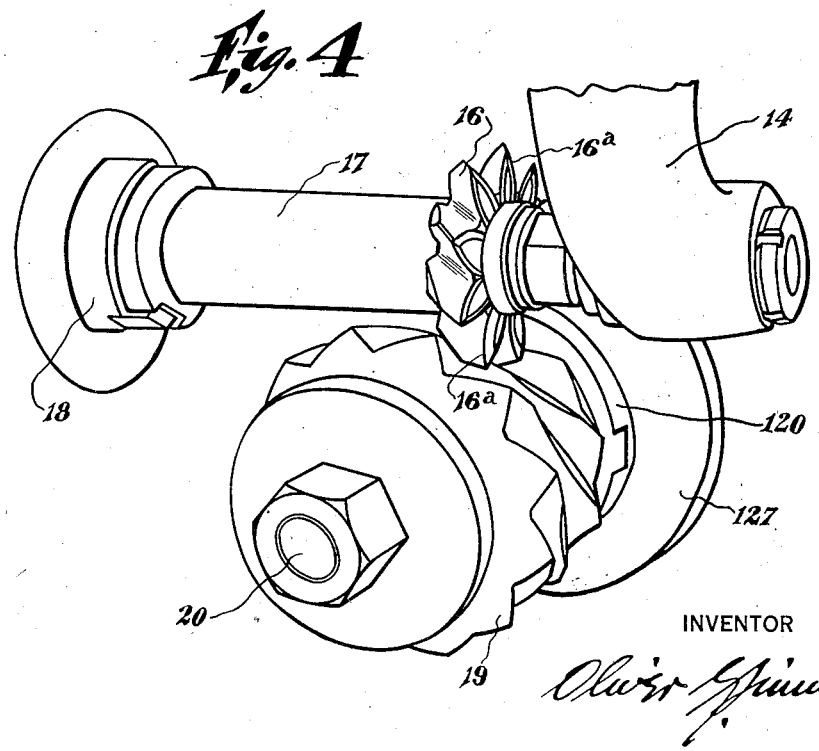
INVENTOR
Oliver Simmons March 26, 1935.  O. G. SIMMONS  1,995,328
WORM WHEEL GENERATING MACHINE
Filed May 11, 1931   21 Sheets-Sheet 4
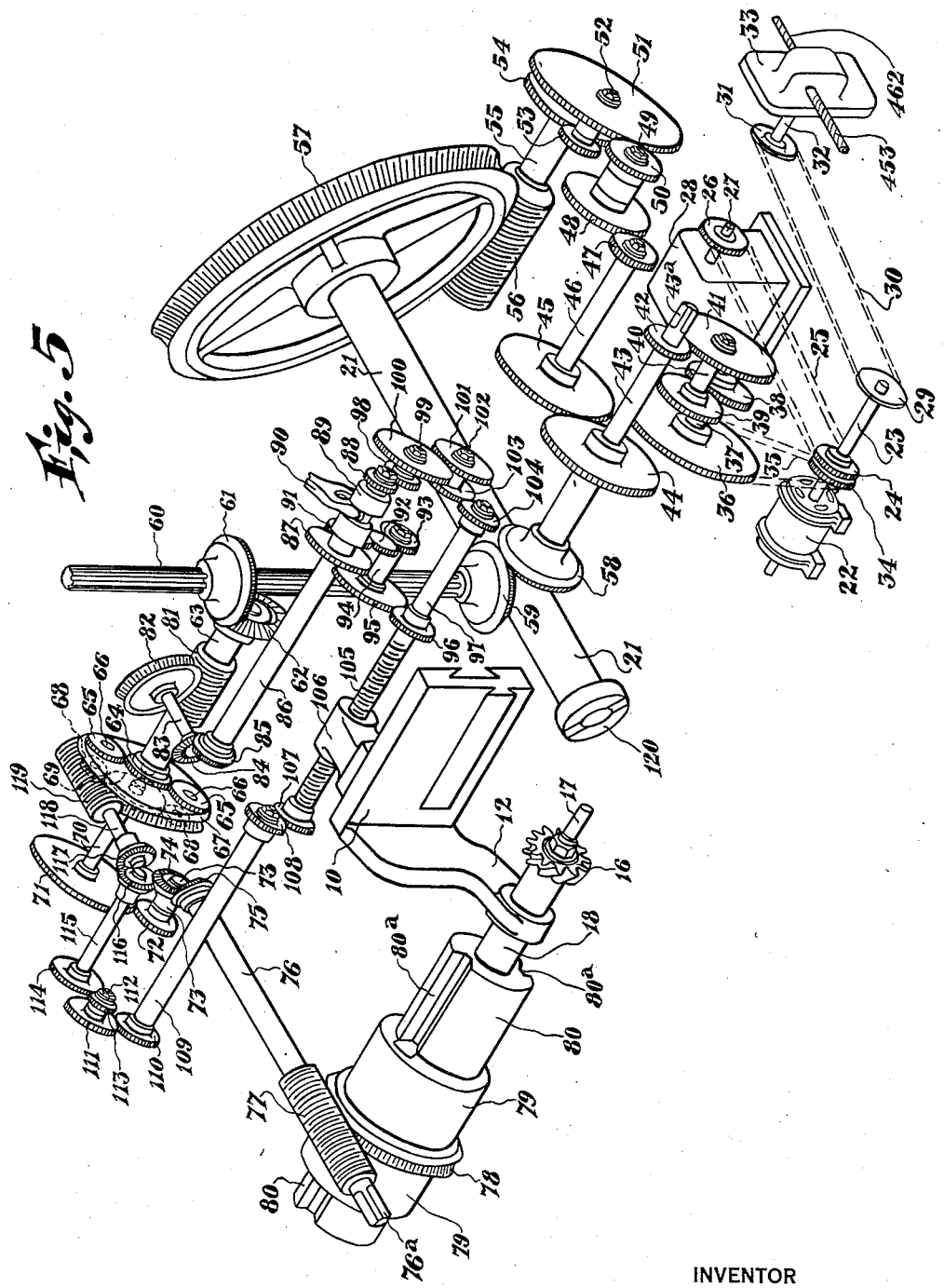
INVENTOR

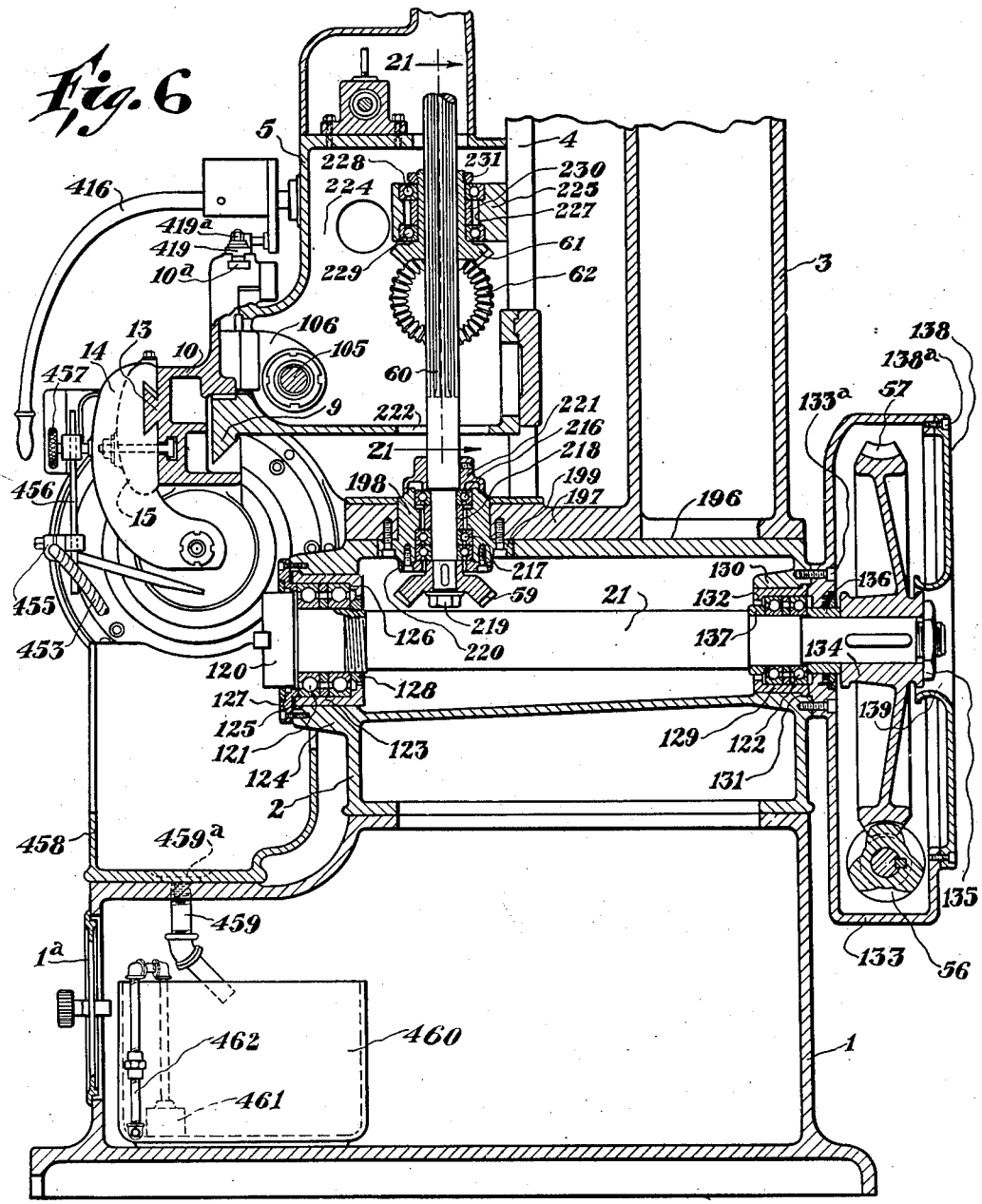

March 26, 1935.　　　O. G. SIMMONS　　　1,995,328
WORM WHEEL GENERATING MACHINE
Filed May 11, 1931　　21 Sheets-Sheet 6
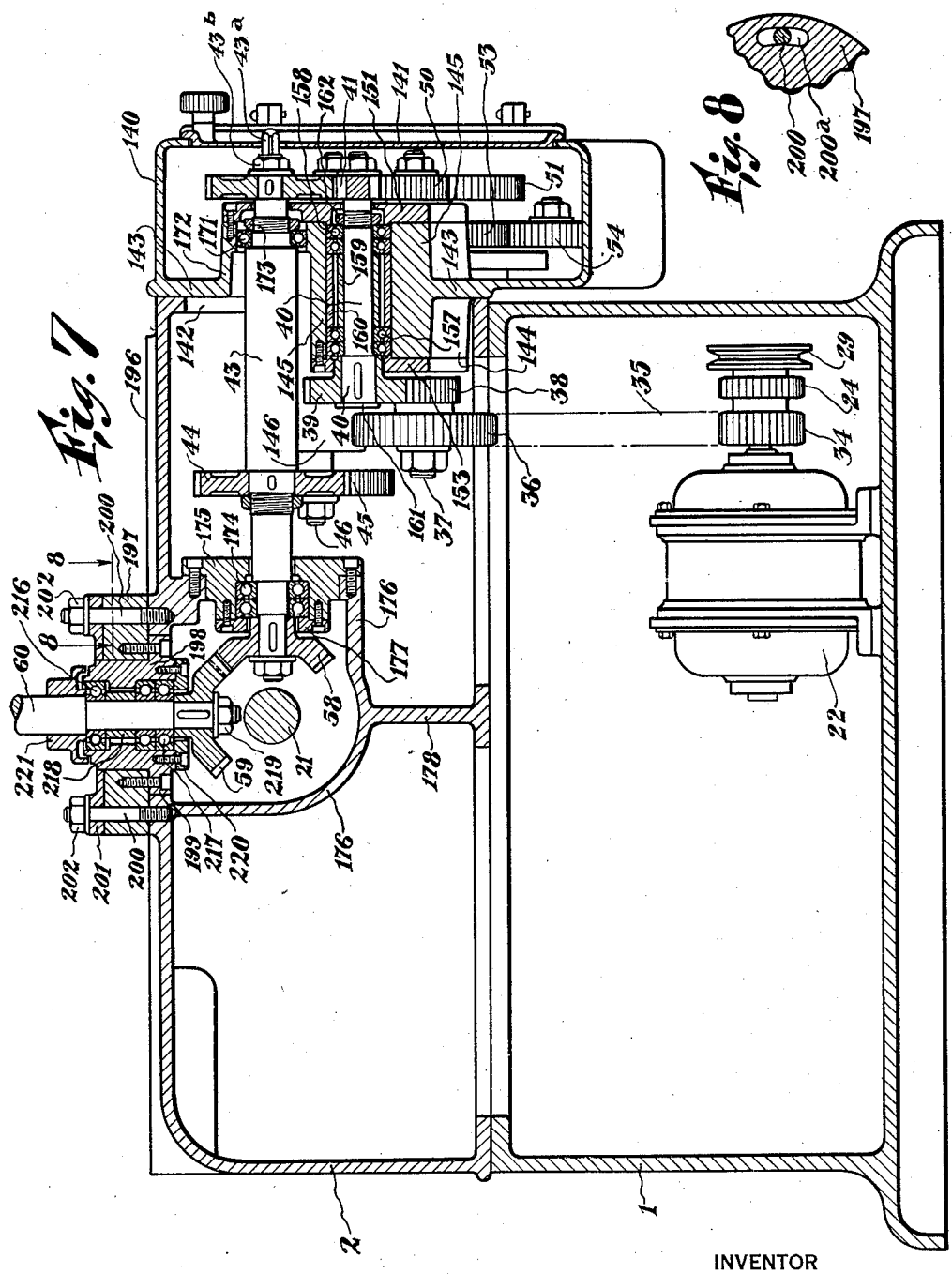
INVENTOR March 26, 1935.     O. G. SIMMONS     1,995,328

WORM WHEEL GENERATING MACHINE

Filed May 11, 1931     21 Sheets-Sheet 7

INVENTOR

Oliver G. Simmons

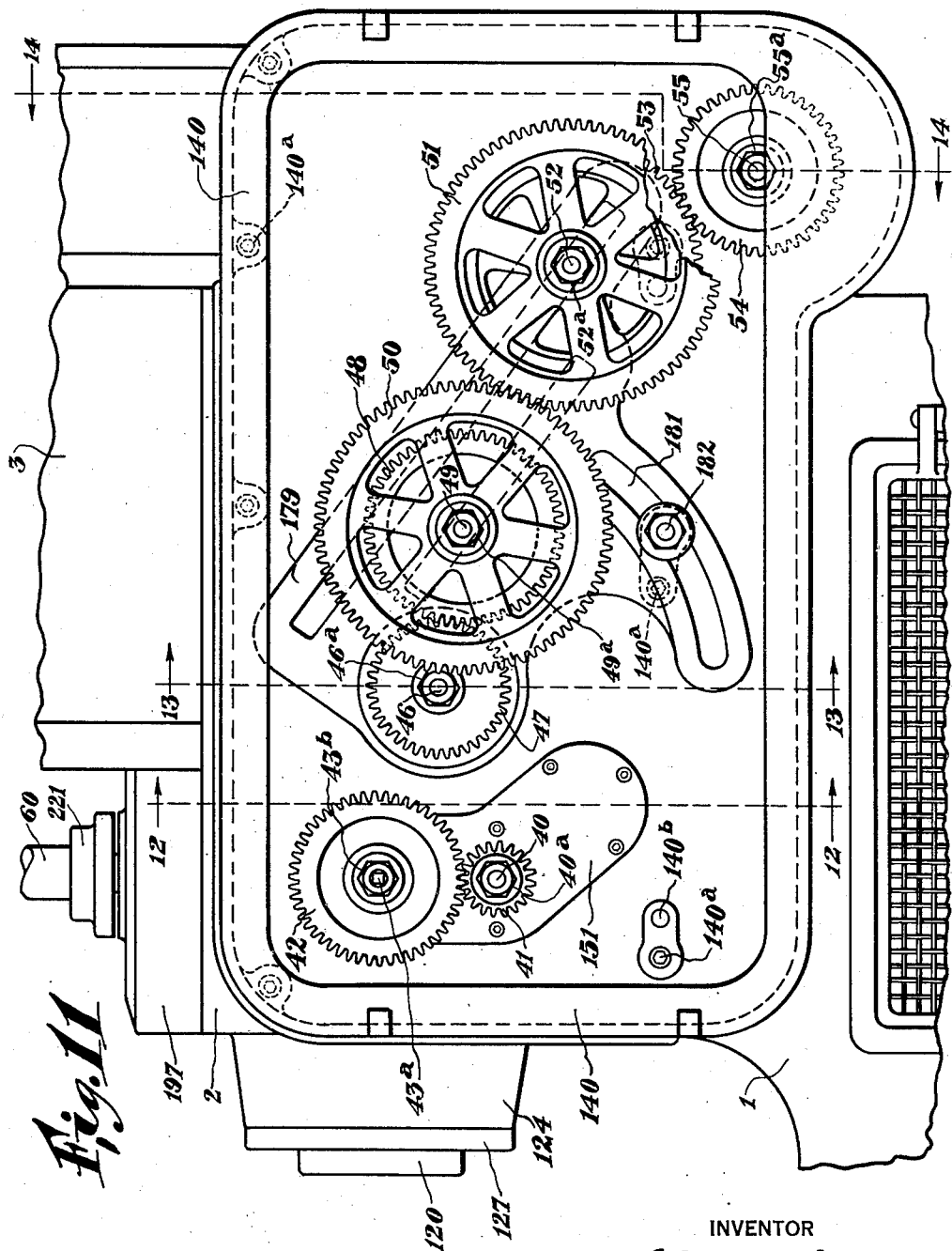

March 26, 1935. O. G. SIMMONS 1,995,328
WORM WHEEL GENERATING MACHINE
Filed May 11, 1931 21 Sheets-Sheet 9
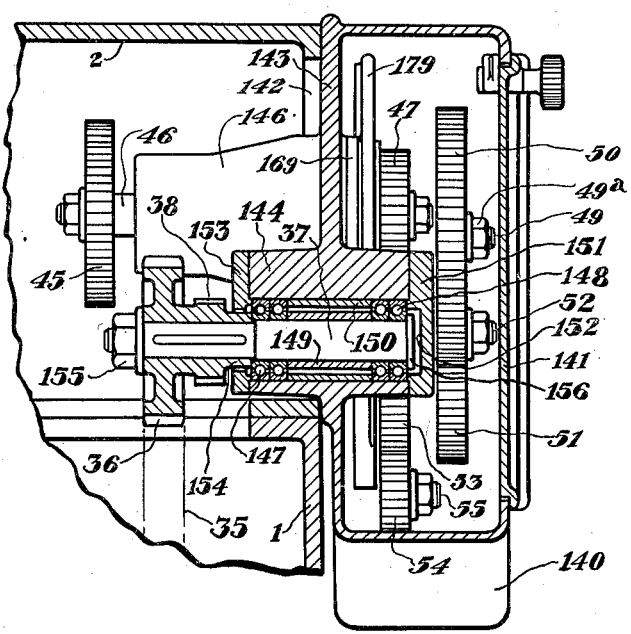
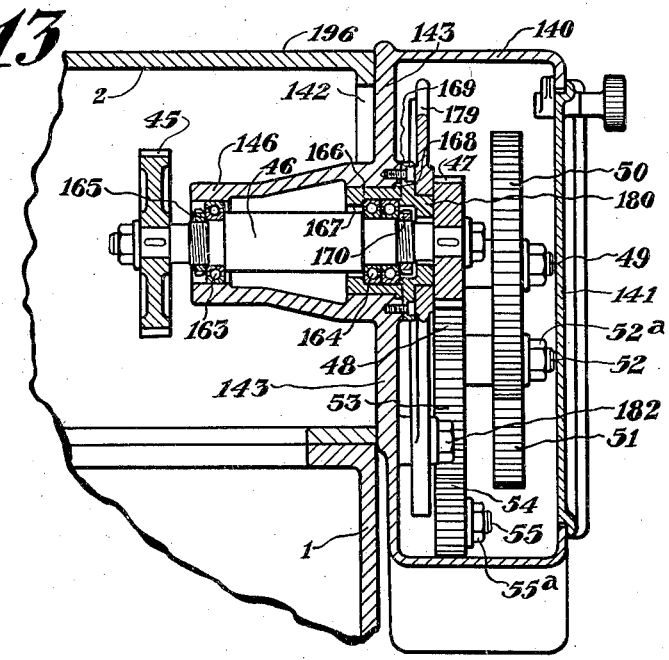
INVENTOR
Oliver G. Simmons.

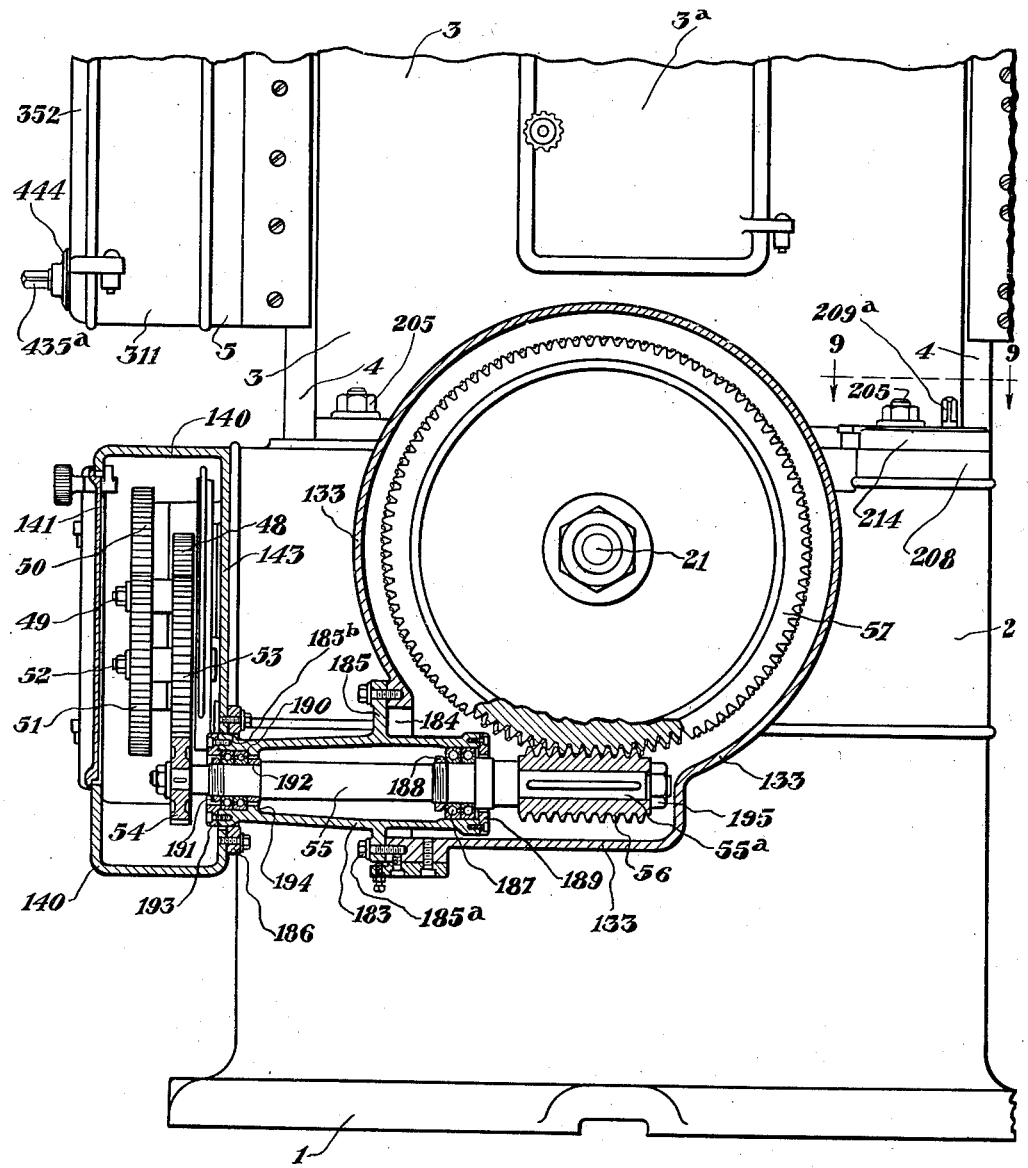

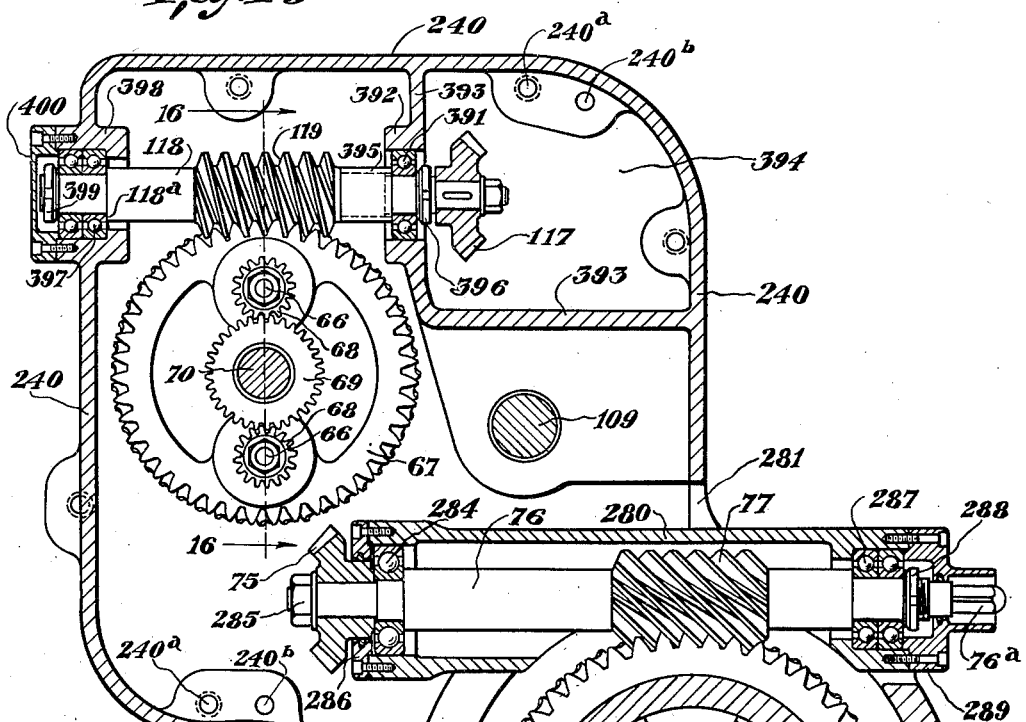
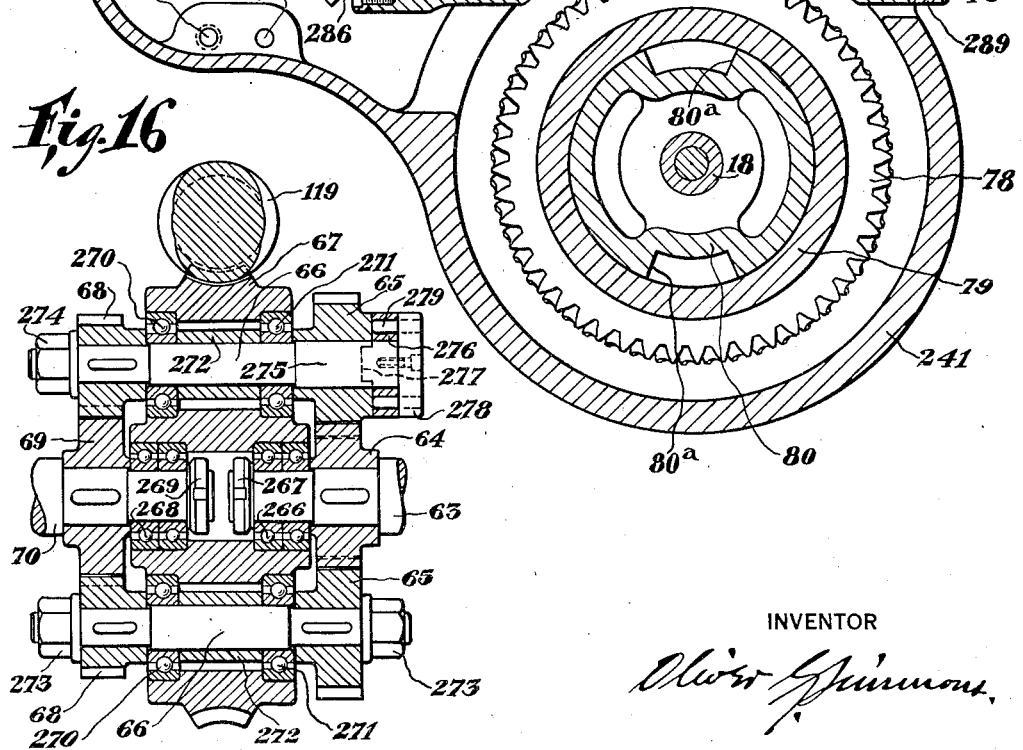

March 26, 1935.  O. G. SIMMONS  1,995,328
WORM WHEEL GENERATING MACHINE
Filed May 11, 1931   21 Sheets-Sheet 12
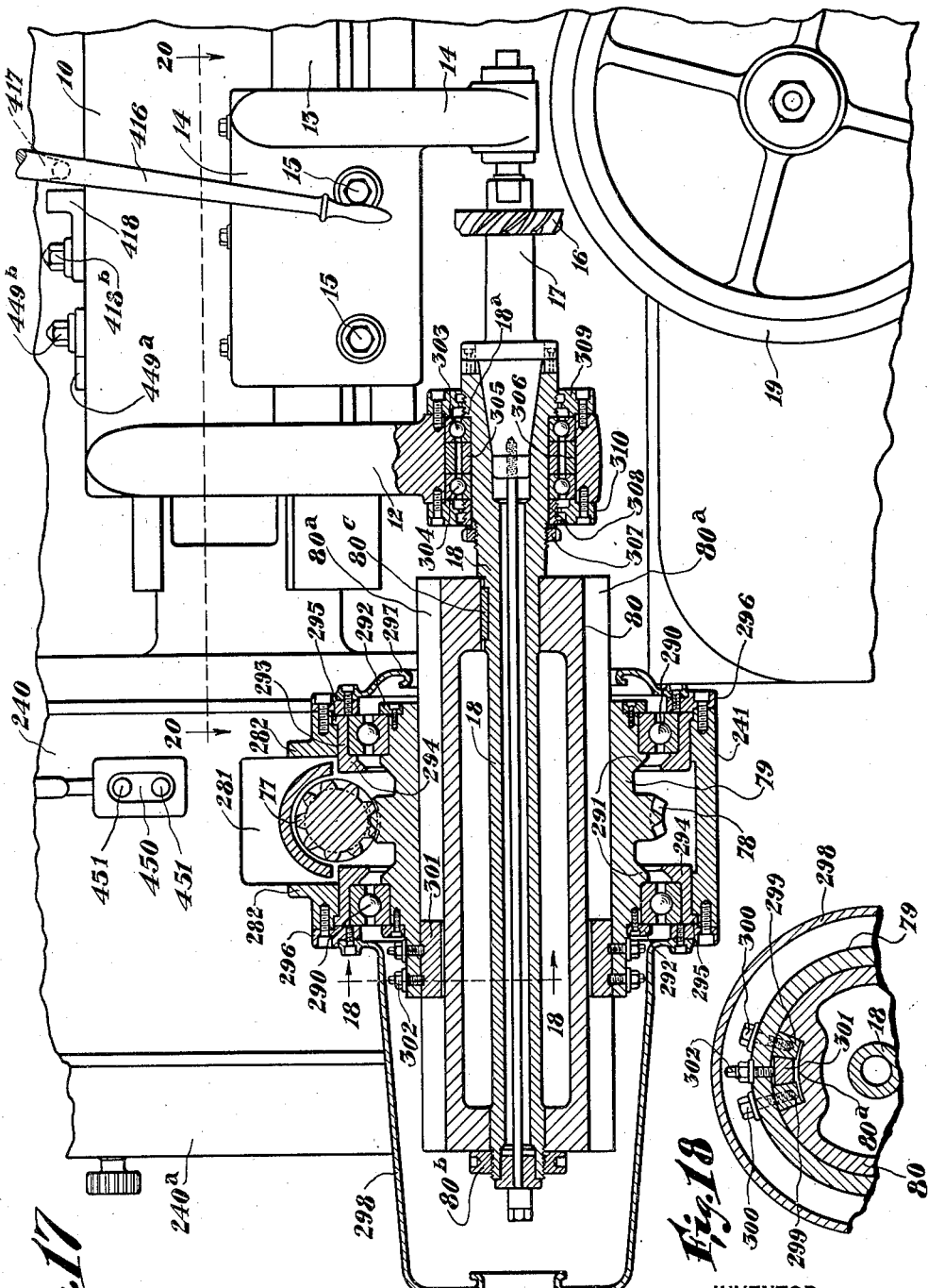
INVENTOR

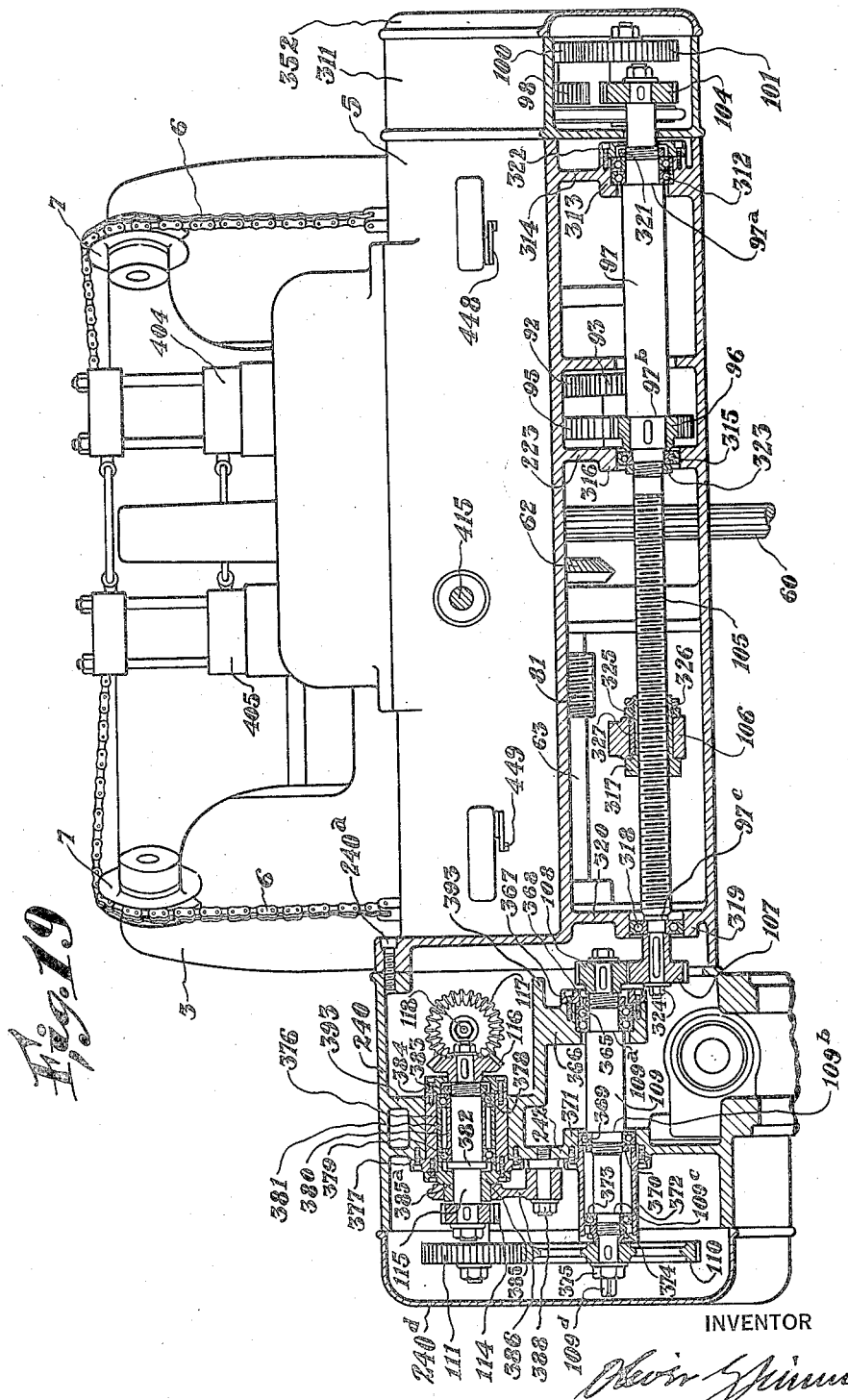

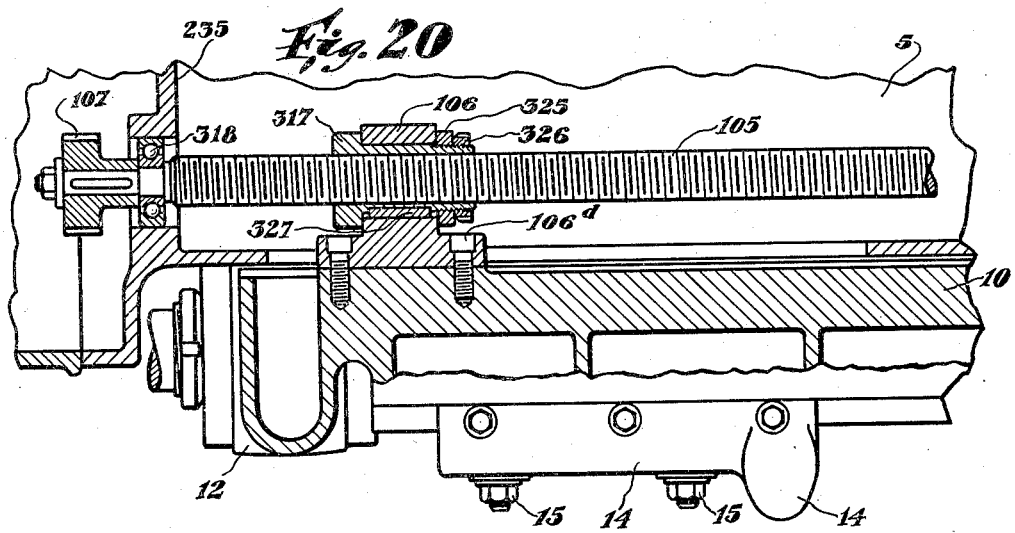
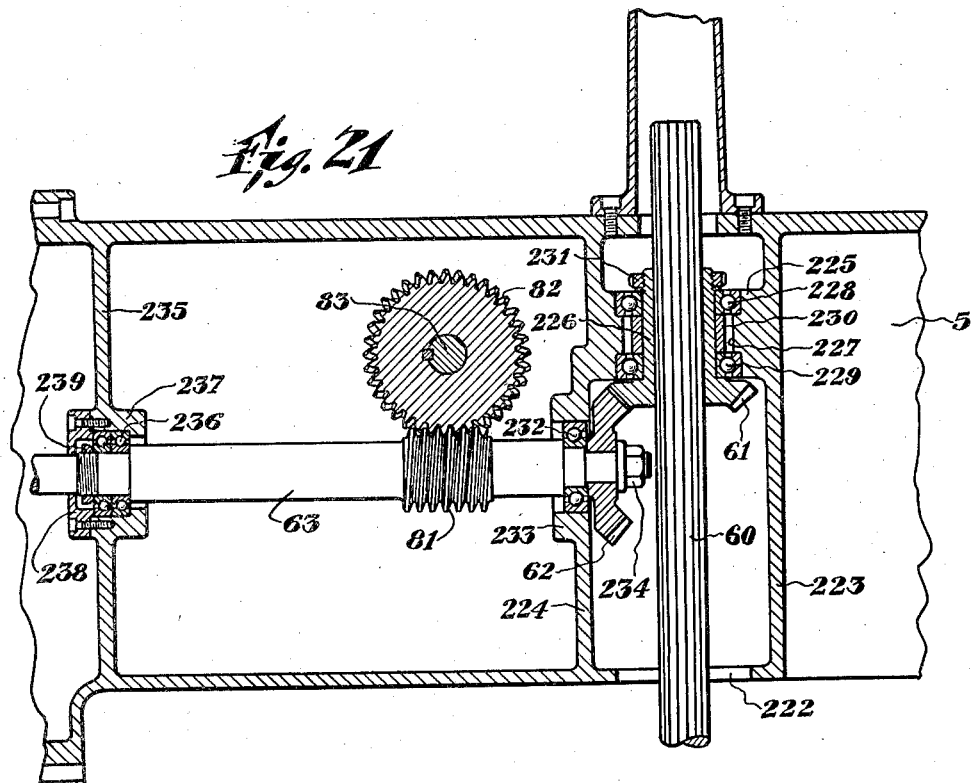

March 26, 1935.  O. G. SIMMONS  1,995,328

WORM WHEEL GENERATING MACHINE

Filed May 11, 1931  21 Sheets-Sheet 15

INVENTOR

Oliver G. Simmons

March 26, 1935.                O. G. SIMMONS                1,995,328
                        WORM WHEEL GENERATING MACHINE
                        Filed May 11, 1931        21 Sheets-Sheet 19

INVENTOR
Oliver G. Simmons

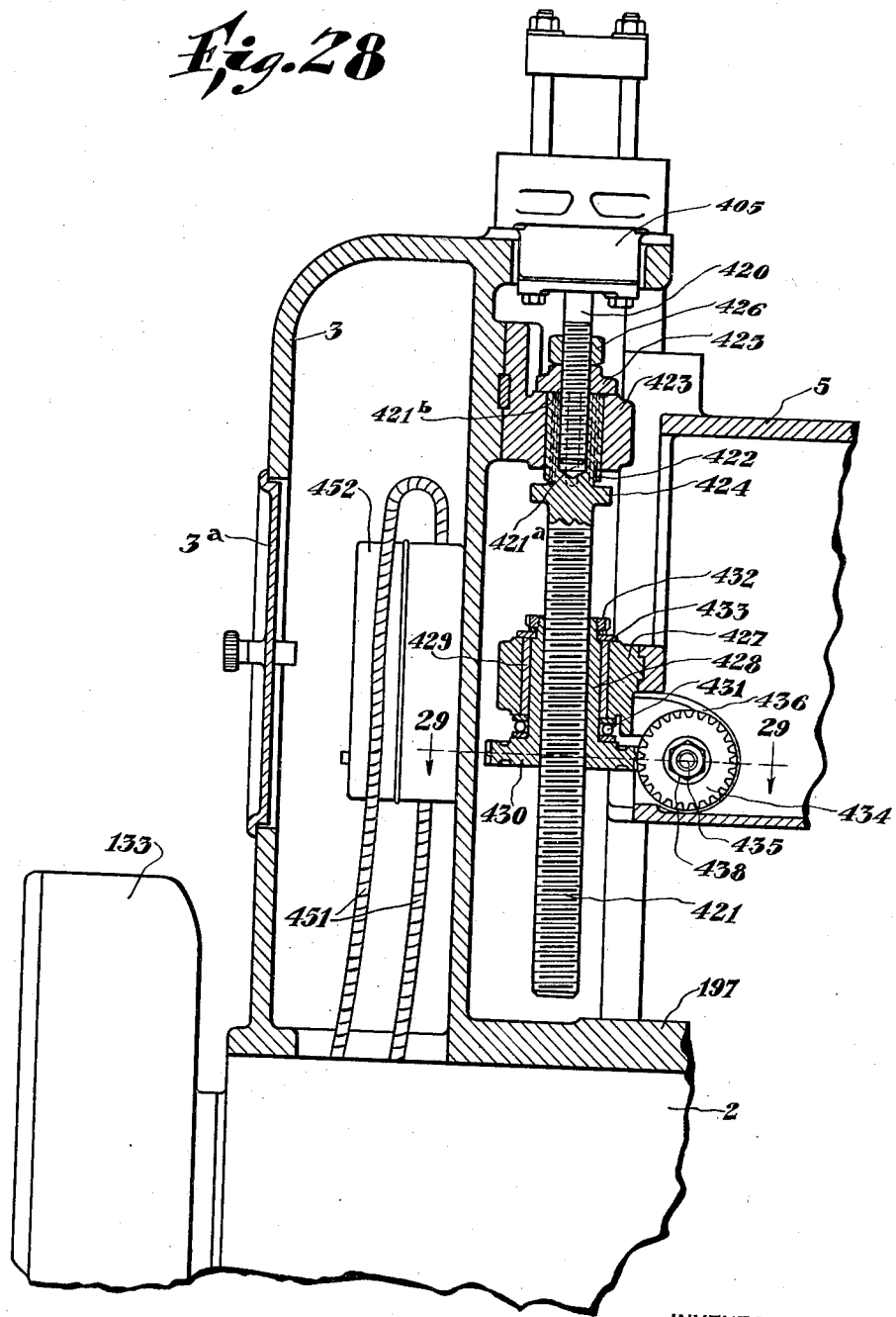

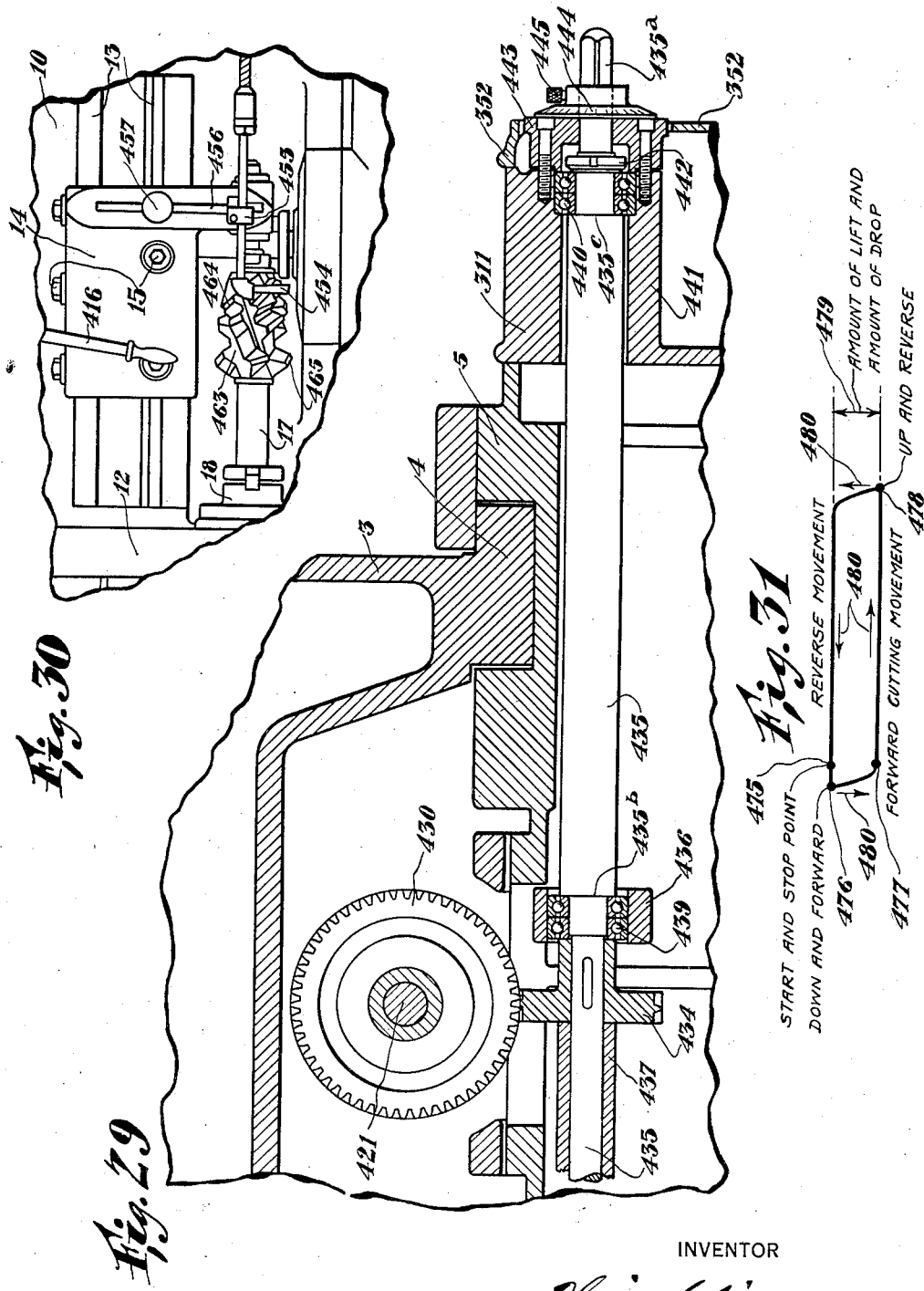

REISSUED

Patented Mar. 26, 1935　　SEP 2- 1941　　1,995,328

UNITED STATES PATENT OFFICE 1,995,328

WORM WHEEL GENERATING MACHINE

Oliver G. Simmons, Lakewood, Ohio, assignor, by mesne assignments, to Dual L. Simmons Application May 11, 1931, Serial No. 536,458

60 Claims. (Cl. 90—4)

This invention relates to worm wheel generating machines and has for its object to provide a machine capable of cutting worm wheels very rapidly and which at the same time will generate worm wheels having teeth which are accurate in contour, spacing and angularity within extremely minute limits of error.

Worm wheels may be generated by means of a worm shaped cutter having cutting edges each of which is disposed in a plane perpendicular to the axis of the cutter and of involute or other form identical with the curve of the teeth of the worm with which the worm wheel is to mesh, measured in a plane perpendicular to the axis of the worm, the cutter having the same number of teeth as the worm and being fed axially with its speed of linear and rotational movement so correlated with respect to each other and with respect to the speed of rotation of the blank as to maintain the cutting edges in the helicoid surfaces of the teeth of an imaginary worm rotating in mesh with the worm wheel being generated.

The present invention has for an object to provide a generating machine capable of effecting the relative rotational and rectilinear movements of the cutter and blank necessary in the practice of the method referred above.

A further object is to provide a drive for the cutter and work spindles including trains of gearing connecting the spindles to a common drive-shaft which normally maintains a predetermined ratio between the speeds of rotation of the spindles, together with means actuated by the driving means for feeding the cutter spindle axially and tangentially with respect to the work, and means actuated by the feeding means for automatically varying the speed of rotation of the cutter spindle proportionally to the speed of linear movement thereof.

It is also an object of the present invention to provide means controlled automatically by the movements of the cutter spindle for raising the cutter spindle after it has moved axially a sufficient distance to carry the cutter across the face of the blank and to bring the cutter to a position out of contact therewith and to return the spindle to its starting position.

A further object is to provide a worm wheel generating machine which is automatically stopped after a cycle of operation in which a worm wheel is completely generated, the cutter returned to starting position and then lowered to operating position, so that it is only necessary to remove the completed worm wheel and replace the same with a worm wheel blank and restart the machine to generate another worm wheel.

A further object is to provide a spindle feed and return mechanism which operates to move the cutter slowly through the work during the cutting of the worm gear, which operates to return the cutter spindle to its original position at a relatively high speed.

A further object is to provide a machine in which the various gear trains are mounted as units in detachable housings, each of which is readily removable with the gearing that is mounted therein so that the machine may be easily assembled and all parts of the mechanism are readily accessible for replacement or repair.

A further object is to dispose the gear trains driving the work and cutter spindles so that the feed mechanism and the cutter speed controlling gear trains and change gears in each of the gear trains are easily accessible for removal and replacement, thus the necessary gear ratios for any particular job may be quickly and easily provided.

A further object is to provide a machine in which the cutter spindle is mounted for axial movement in a vertically movable housing which carries gearing for driving the cutter spindle and feeding the same axially, the vertically movable housing being counterbalanced and provided with means by which it may be adjusted manually to position the cutter spindle at the correct radial distance from the work spindle for generating worm wheels of various diameters.

A further object is to provide hydraulically operated, automatically controlled means for elevating the housing carrying the cutter spindle after the completion of each cutting operation a sufficient distance to position the cutter clear of the work, and for simultaneously reversing the feed mechanism to return the spindle to starting position.

A further object is to provide a cutter spindle which is rigidly supported in a slide mounted for horizontal movement on the vertically movable housing and which is splined in a driving element rotatably mounted in a fixed position in a vertically movable housing.

A further object is to provide a generating machine in which the cutter and the blank are attached to the ends of the cutter and work spindles and positioned clear of other parts of the machine so that they are conveniently accessible for removal and replacement.

With the above and other objects in view, the invention may be said to comprise the worm generating machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 2 is a side elevation of the machine;

Fig. 3 is a perspective view showing a cutter and a blank in the position which they occupy prior to the generating operation;

Fig. 4 is a perspective view similar to Fig. 3 showing a worm wheel which has been completely generated during one pass of the cutter across the face of the blank, and showing the cutter in the position which it occupies after having passed across the face of the blank and completely generated the worm wheel;

Figure 1:
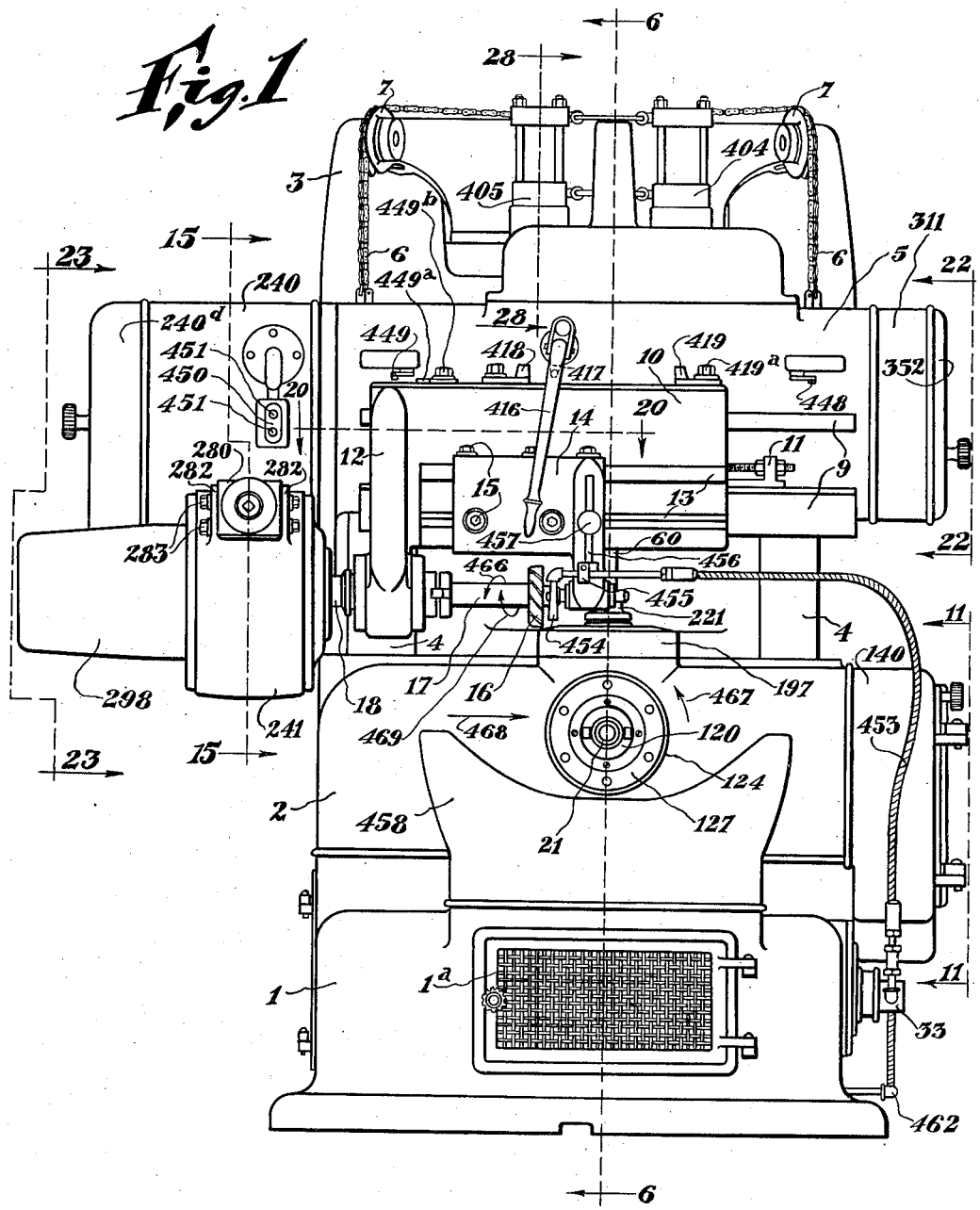
Fig. 1 is a front elevation of a machine embodying the invention.

Fig. 5 is a diagrammatic perspective view showing the gear trains through which the various parts of the machine are actuated, the gearing and supporting shafts being shown in approximately the positions which they occupy in the machine, the relative positions of some of the shafts and gears and the relative sizes thereof being somewhat different from the actual machine, for convenience of illustration;

Fig. 6 is a central vertical section taken on the line indicated at 6—6 in Fig. 1;

Fig. 7 is a central vertical section taken on the line indicated at 7—7 in Fig. 2;

Fig. 8 is a fragmentary section taken on the line indicated at 8—8 in Fig. 7;

Fig. 9 is a top plan view in which a portion of the frame at the right is broken away and shown in section on the line indicated at 9—9 in Fig. 2, and in which a portion of the frame at the left is broken away and shown in section on the line indicated at 9—9 in Fig. 14;

Fig. 10 is a section taken on the line indicated at 10—10 in Fig. 9;

Fig. 11 is a side elevation of the lower portion of the machine with the doors of the gear housing removed to show the change gears in the gear train which drives the work spindle, the view being taken as indicated by line 11—11 in Fig. 1;

Fig. 12 is a fragmentary vertical section through the gear train which drives the work spindle, the section being taken on the line indicated at 12—12 in Fig. 11;

Fig. 13 is a fragmentary vertical section through the work spindle driving gear train, the section being taken on the line indicated at 13—13 in Fig. 11;

Fig. 14 is a vertical section through the worm gearing at the rear of the frame through which the work spindle is driven, the section being taken on the line indicated at 14—14 in Figs. 2 and 11;

Fig. 15 is a vertical section through the cutter spindle housing taken on the line indicated at 15—15 in Fig. 1.

Figure 22:
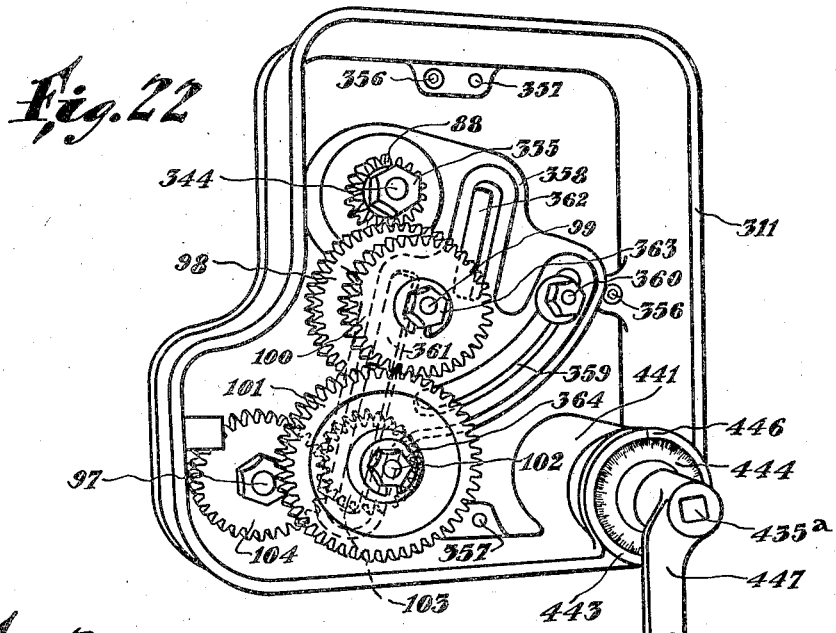
Figure 23:
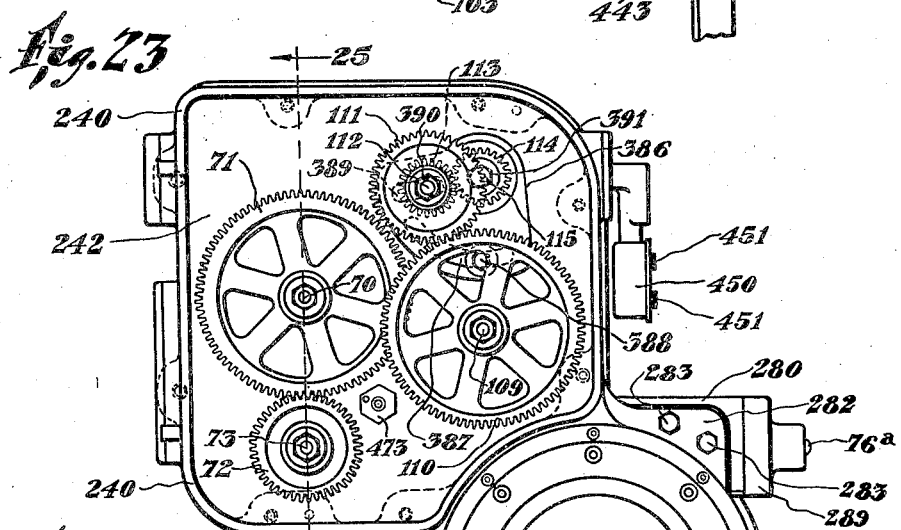
Figure 23A:
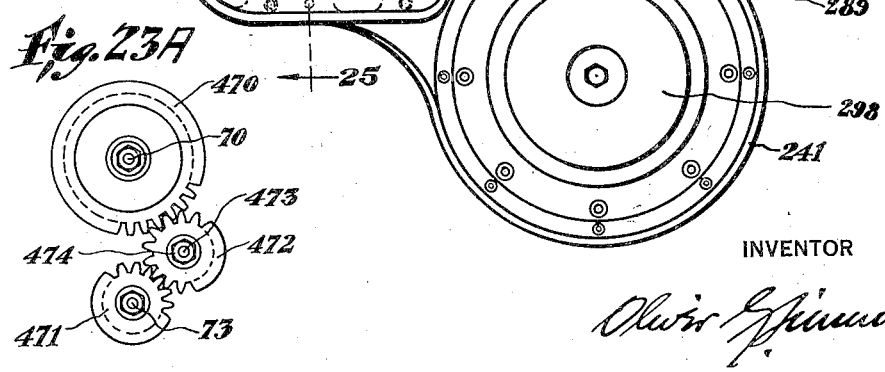
Figure 24:
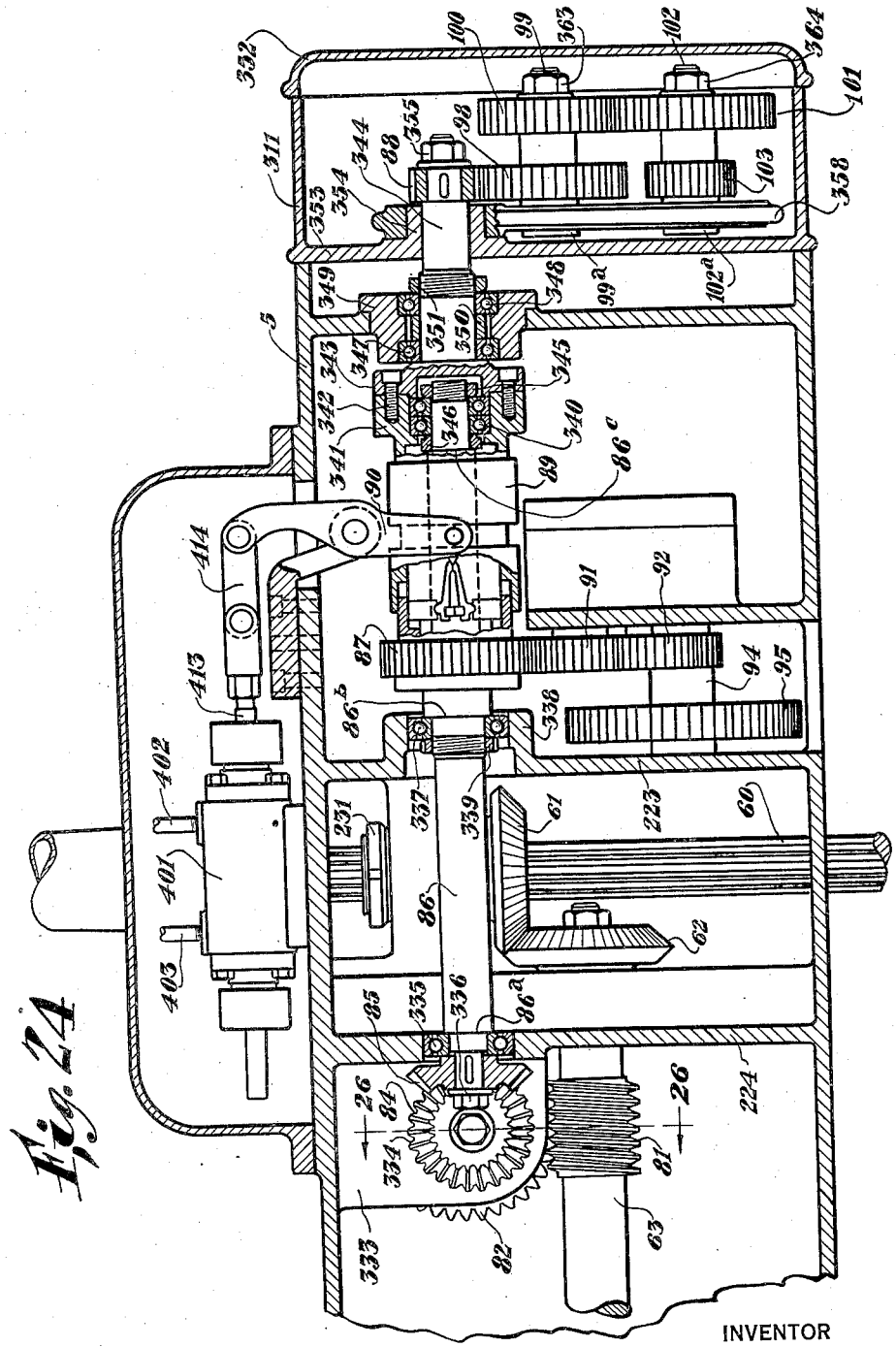

Fig. 16 is a section through the planetary gearing of the cutter spindle driving mechanism taken on the line indicated at 16—16 in Fig. 15;

Fig. 17 is a fragmentary front elevation of the end portion of the machine in which the cutter spindle is mounted, the spindle housing being broken away and shown in vertical section on the line indicated at 17—17 in Fig. 2;

Fig. 18 is a fragmentary vertical section through one of the adjustable spline gibs interposed between the cutter spindle and worm wheel, the section being taken on the line indicated at 18—18 in Fig. 17;

Fig. 19 is a vertical section through the vertically movable cutter spindle supporting housing taken on the line indicated at 19—19 in Fig. 2;

Fig. 20 is a fragmentary horizontal section taken on the line indicated at 20—20 in Figs. 1 and 17, showing the connection between the cutter spindle actuating slide and the lead screw by which it is actuated;

Fig. 21 is a fragmentary vertical section 21—21 in Figs. 2 and 6;

Fig. 22 is a perspective view of a gear housing at one end of the machine with the door removed to show the change gears, the view being taken as indicated by line 22—22 in Fig. 1;

Fig. 23 is a side elevation of a gear housing at the end of the machine opposite the gear housing shown in Fig. 22, the door being removed to show the change gears, the view being taken as indicated by line 23—23 in Fig. 1;

Fig. 23A is a partial view of the cutter spindle drive gearing shown in Fig. 23, illustrating the position of the idler gear for cutting a worm wheel of opposite hand;

Fig. 24 is a fragmentary vertical section through the reversing mechanism through which the cutter spindle feeding mechanism is actuated, the section being taken on the line 24—24 in Fig. 2.

Figure 25:
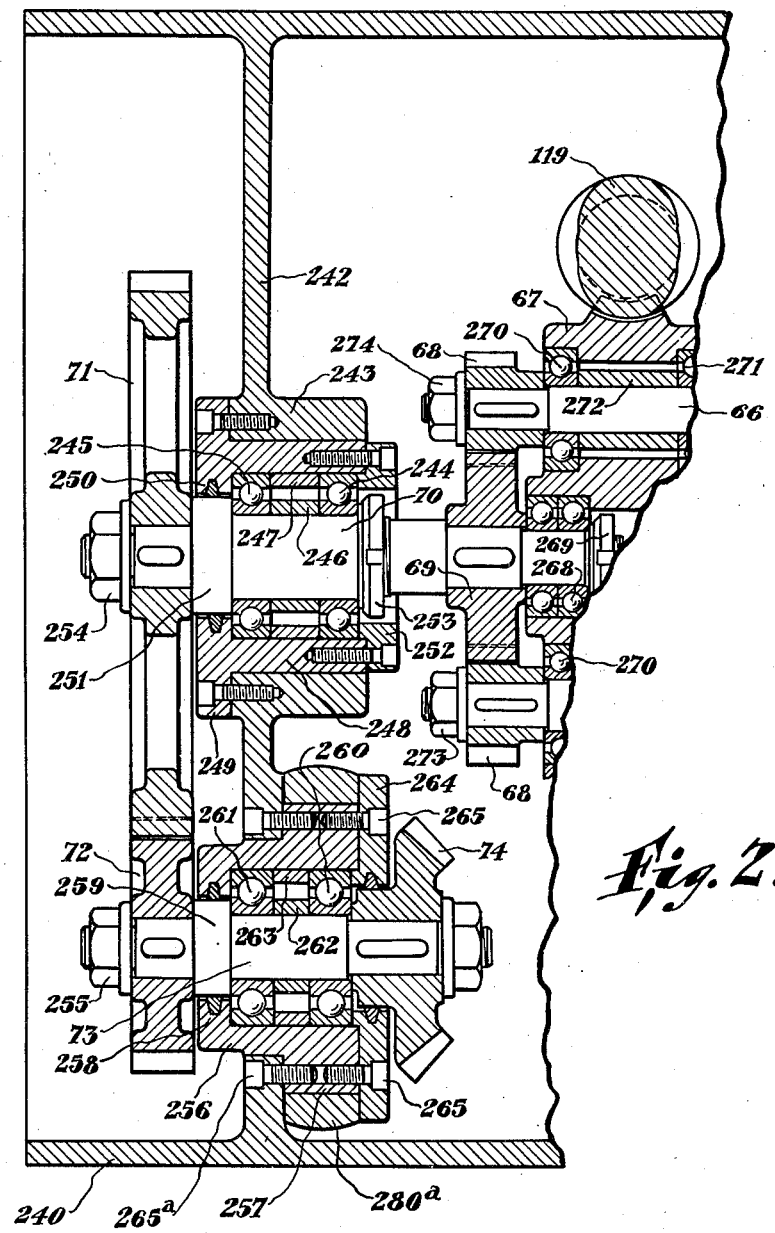
Figure 26:
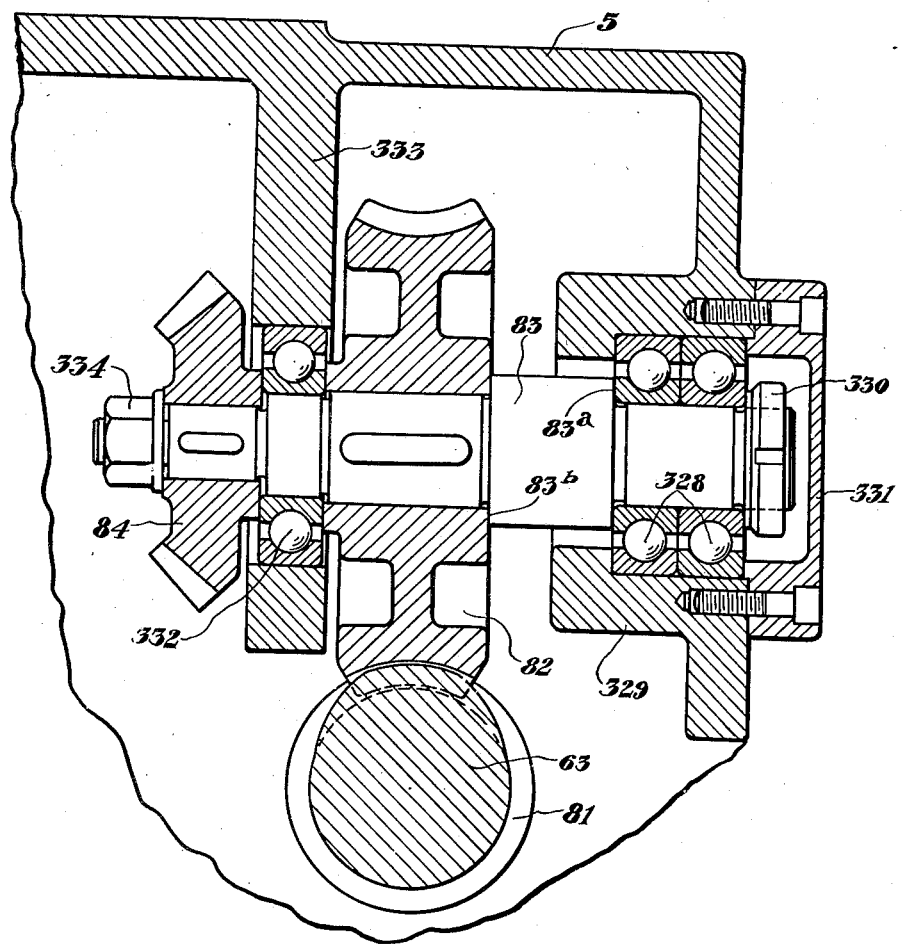

Fig. 25 is a fragmentary vertical section taken on the line 25—25 in Fig. 23;

Fig. 26 is a fragmentary vertical section taken on the line 26—26 in Fig. 24;

Fig. 27 is a diagrammatic view showing the automatically controlled, hydraulically actuated devices for reversing the feed of the cutter spindle, to lift the spindle carrying housing so that the cutter clears the work during its return movement, to lower the spindle and engage the feed during the forward cutting movement of the spindle;

Fig. 28 is a vertical section through one of the housing adjusting screws taken on the line 28—28 in Fig. 1;

Fig. 29 is a horizontal section taken on the line 29—29 in Fig. 28;

Fig. 30 is a fragmentary front elevation showing the machine provided with a cutter of a type different from that shown in previous views.

Fig. 31 is a diagrammatic graphical chart of the movements of the cutter during a cycle of operation of the machine.

*Machine framework*

As best shown in Figs. 1, 2, 6 and 7, the machine is mounted upon a hollow supporting base 1 which may serve as a motor and pump housing. Upon the top of the base 1 there is mounted a hollow housing 2 which provides a support for the work spindle and the work spindle actuating mechanism. The housing 2 has a flat top which provides a bed for a turret 3 which has limited angular adjustment about a central vertical axis, as will be hereinafter more fully explained. The front face of the turret 3 is provided with vertical ways 4 upon which is mounted a vertically movable horizontally disposed housing 5 which provides a support for the cutter spindle and its actuating mechanism. The major portion of the weight of the housing 5 is supported by counterbalancing means consisting of chains 6 attached to the housing adjacent the ends thereof and extending over sheaves 7 mounted on the turret at the top thereof and attached to counterweights 8. The housing 5 is provided on its front face with horizontal ways 9 upon which is mounted a slide 10 which supports the axially movable cutter spindle. The slide 10 carries an adjustable shim 11 by means of which a close fit is maintained between the slide 10 and the ways 9. At one end thereof the slide 10 has an integral forwardly projecting bearing bracket 12 and the front face of the slide is provided with horizontal ways 13 which support an adjustable tailstock 14 which may be secured in various adjusted positions by means of clamping bolts 15.

Principle of operation

As best shown in Figs. 3 and 4 of the drawings, a worm shaped cutter 16 is carried by an arbor 17 which is clamped at its rear end to a cutter spindle 18, and is supported at its forward end by the tailstock 14. The end of the spindle 18 to which the arbor 17 is attached is journaled in the bracket 12 integral with the slide 10 and is rigidly held against axial movement with respect to the bracket so that the spindle is constrained to move with the slide 10 and the arbor 17 is rigidly held between the tailstock 14 and the end of the spindle 18. A blank 19 is rigidly secured upon an arbor 20 which is detachably secured to the forward end of a work spindle 21 which is mounted in the housing 2 and extends from the front to the rear of the machine (see Fig. 6). The cutter 16 has teeth of a form corresponding to that of the worm which meshes with the worm wheel to be generated, except that the helicoid side faces of the teeth are formed with a slight taper from the forward cutting face to the rear ends thereof as is common practice with gear shaper cutters in order to provide a slight clearance angle between the faces of the teeth of the cutter and the faces of the teeth being generated.

The cutting edges 16ª of the cutter are so formed that each lies in a plane perpendicular to the axis of the cutter and if the cutter is of involute form, each cutting edge will be in the form of an involute of a circle. The front faces of the teeth of the cutter are preferably ground back along the cutting edges to form helicoid surfaces of the same form as the side faces of the cutter teeth but of opposite hand which intersect the helicoid side faces of the teeth at substantially right angles so that the opposite cutting edges of each tooth will have substantially identical cutting action and, since helicoids of identical form in planes perpendicular to the axis and of opposite angularity intersect in a plane perpendicular to the axis, all of the cutting edges will have exactly the same form. The method of grinding back the faces of the cutter teeth is fully disclosed in my co-pending application Serial No. 428,846, filed February 15, 1930 now Patent No. 1,809,869, issued June 16, 1931. A cutter of the type above mentioned may have its teeth very accurately finished in a generating grinding machine, such for instance as that disclosed in my Patent No. 1,767,191, granted June 24, 1930, and the correctness of tooth contours may be very accurately checked by means of testing machines such as commonly used for measuring involute gears and involute gear shaper cutters. By providing cutting edges which lie in planes perpendicular to the axis of the cutter and which are themselves true involutes, errors in generating action due to the relatively steep taper required in hobs are eliminated.

The action of the cutters on the blank corresponds to the action which the worm conjugate to the worm wheel being generated would have on a cylinder of soft compressible material of a diameter corresponding to that of the worm wheel if the cylinder were positioned with its axis at the same radial distance from the worm axis as the worm wheel when in mesh with the worm and the cylinder and worm were rotated at the relative speed at which the worm and worm wheel rotate when in mesh with each other and the form of worm wheel teeth generated are the same as would be molded by the worm in the soft cylinder. The cutter in the present machine may, therefore, be said to operate on the molding generating principle.

During the operation of the machine a slow feed movement is imparted to the slide 10, advancing the cutter from the position shown in Fig. 3 into engagement with the blank and through the blank to the position shown in Fig. 4. During this feed movement of the cutter the cutter is given a relatively rapid rotating movement and the work spindle is rotated at a speed such that intermeshing relationship is maintained between the cutter and the worm wheel being generated. As previously explained, the speed of rotation of the cutter 16 is so correlated to its rate of axial movement that the cutting edges 16ª are maintained in the helicoid surfaces of the faces of the teeth of an imaginary worm rotating in mesh with the worm gear being generated so that the worm wheel teeth are generated on the molding generating principle.

The cutter 16 is set to cut to full depth in the blank 19 and when the cutter has reached the position shown in Fig. 4, the worm gear is completely generated. The cutter has generating action to finish the teeth of the worm wheel on one side while entering the blank and to finish the teeth upon the opposite side while the cutter is traveling from the position in which it engages the blank to full depth to the position in which it is out of contact with the blank.

As will be hereinafter more fully explained, the machine has a cycle of operation such that when the machine is started into operation the cutter is fed from the position shown in Fig. 3 to the position shown in Fig. 4, whereupon the housing 5 is automatically lifted a sufficient distance to bring the cutter 16 entirely above the worm gear which has been generated, and the movement of the slide 10 is then reversed returning the same to its original position, whereupon the housing 5 is lowered to its original position and the machine is brought to a stop ready to be started again as soon as another blank has been placed on the work spindle.

Actuating mechanism

Referring to Fig. 5 of the drawings which shows the complete layout of the actuating mechanism, the machine of the present invention may be driven by means of an electric motor 22 preferably mounted in the housing 1, the motor 22 having a shaft 23 from which pumps for circulating cutter cooling liquid and for supplying pressure to hydraulic cylinders employed for actuating parts of the machine may be operated as well as the work and cutter spindles. The shaft 23 may be provided with a sprocket 24 connected by a sprocket chain 25 through a sprocket 26 upon the driveshaft 27 of a suitable pump 28 which may be used for supplying pressure to the hydraulic cylinders above mentioned. The shaft 23 may also be provided with driving pulley 29 which drives a belt 30 extending over a pulley 31 on driveshaft 32 of a pump 33 for circulating the cooling liquid.

The sprocket 34 adjacent the motor armature, is mounted on the shaft 23 from which both the work spindle and the cutter spindle are actuated. The sprocket 34 drives a sprocket chain 35 which extends over a sprocket 36 fixed to a shaft 37 to which is fixed a gear 38 which meshes with a gear 39 fixed to the inner end of a countershaft 40 which has a gear 41 fixed to the outer end thereof, which in turn meshes with a gear 42 fixed to the outer end of a shaft 43 (see Figs. 5, 7 and 12). The shaft 43 is mounted within the housing 2 and is connected by gearing both to the work spindle 21 and to the cutter spindle 18.

The shaft 43 has a squared end 43ᵃ projecting outwardly from the gear 42 which is adapted to be engaged by a suitable hand crank so that the cutter and work spindles and their actuating mechanisms may be operated by hand when the operator wishes to test the operation prior to starting the motor to determine whether the adjustments have been correctly made and to aid in making adjustments.

The work spindle is driven from the shaft 43 through a gear 44 fixed to the shaft 43, which meshes with a gear 45 fixed to a countershaft 46 which has a gear 47 fixed to the outer end thereof which meshes with a gear 48 on a short shaft 49, which has a gear 50 at its outer end meshing with a gear 51 fixed to the outer end of a shaft 52, which has a gear 53 attached to its inner end meshing with a gear 54 fixed to the outer end of a horizontal shaft 55 at the rear of the machine (see Figs. 5, 7, 12, 13 and 14). The shaft 55 has a worm 56 fixed thereto which meshes with a large worm wheel 57 fixed to the rear end of the work spindle 21. The gears 41 and 42, 47, 48, 50, 51, 53 and 54 are all readily detachable change gears, accessible from an end of the machine, which may be replaced with other gears of different sizes to provide the desired gear ratio between the shafts 23 and 43 and between the shaft 43 and work spindle 21.

The cutter spindle actuating mechanism is operated through a miter gear 58 fixed to the inner end of the shaft 43 which meshes with a miter gear 59 fixed to the lower end of a vertical shaft 60. The shaft 60 is mounted in fixed position in the turret 3 at the pivotal axis thereof and is a splined shaft having thereon a slidable miter gear 61 which moves with the housing 5 and meshes with a miter gear 62 fixed to the inner end of a shaft 63 which is carried by the housing 5. The miter gear 61 slides up and down upon the splined shaft 60 as the housing 5 is raised and lowered so that a constant driving relationship is maintained between the shaft 60 and the mechanism carried by the housing 5 regardless of the position of the housing.

At its outer end, the shaft 63 has fixed thereto a spur gear 64 which meshes with a pair of planetary gears 65 which are mounted on short shafts 66 journaled in a rotary carrier 67 which has the form of a worm wheel. The short shafts 66 have fixed to the outer ends thereof gears 68 of a diameter differing from that of the gears 65 which mesh with a gear 69 fixed to the inner end of a shaft 70 which is mounted in axial alignment with the shaft 63. Assuming that the planetary gear carrying worm wheel 67 is held against rotation, the shaft 70 will be driven in the same direction as the shaft 63 at a speed which has a constant ratio to the speed of rotation of the shaft 63 which is determined by the relative sizes of the gears 64, 65, 68 and 69. If the worm wheel 67 carrying the differential planetary gears is driven in one direction or the other, the speed ratio between the shaft 63 and 70 will be increased or decreased by an amount proportional to the rate of rotation of the worm wheel 67.

The cutter spindle 18 is driven from the shaft 70 and the worm gear 67 is driven from the spindle feed mechanism, as will be hereinafter more fully explained, the gear ratios being such as to properly correlate the speed of rotation of the cutter 16 to the rate of axial movement thereof and maintain the generating cutting edges in the tooth surfaces of the imaginary generating worm. The spindle 18 is driven from the shaft 70 through a gear 71 fixed to the outer end of the shaft 70 which meshes with a gear 72 fixed to a countershaft 73 which has a miter gear 74 fixed to its inner end and in mesh with a miter gear 75 on a shaft 76 which extends forwardly over the cutter spindle 18. The shaft 76 carries a worm 77 which meshes with a worm wheel 78 mounted concentrically with the spindle 18. The worm wheel 78 is mounted in a fixed position and has an elongated hub 79 which is splined to a hollow elongated cylinder 80 fixed to the spindle 18 and forming an enlargement thereof, so that the spindle 18 is constrained to rotate with the worm wheel 78 but is permitted to slide axially therein.

The shaft 76 has a squared end 76ᵃ projecting beyond the worm 77 which is adapted to be engaged by suitable hand crank so that rotation may be imparted to the cutter spindle manually when it is desired to position the cutter spindle or test the operation of the mechanism after an adjustment has been made.

The cutter spindle feed mechanism is actuated from the shaft 63 by suitable gearing such as a worm 81 thereon meshing with a worm wheel 82 fixed to a forwardly extending shaft 83 to which is fixed a miter gear 84 meshing with a miter gear 85 on a shaft 86 extending longitudinally of the housing 5 (see Figs. 5, 21 and 24). The shaft 86 drives the actuating means for the slide 10 through a reversing mechanism at one end of the housing 5, the shaft 86 having a pair of gears 87 and 88 rotatable thereon and spaced apart a sufficient distance to accommodate a shiftable clutch element 89 splined to the shaft 86 and movable into clutching engagement with either one of the gears 87 and 88, the clutch element 89 being operated by a shifter lever 90. The gear 87 meshes with a gear 91 which in turn meshes with an intermediate gear 92 which meshes with a gear 93 on a shaft 94 which has a gear 95 meshing with a gear 96 on a lead screw shaft 97 extending longitudinally of the housing 5 adjacent the front thereof. When the gear 87 is clutched to the shaft 86 it drives the shaft 97 through the gears 91, 92, 93, 95 and 96. A second gear train is interposed between the shafts 86 and 97 to drive the shaft 97 in the direction opposite that in which it is driven from the gear 87 when the gear 88 is clutched to the shaft 86. This gear train consists of a gear 98 meshing with the gear 88 and fixed to a shaft 99 which has a gear 100 meshing with a gear 101 on a countershaft 102, to which is fixed a gear 103 meshing with a gear 104 fixed to one end of the shaft 97. The gears 98, 100, 101, 103 and 104 are change gears for which other gears of different sizes may be readily substituted to increase or decrease the gear ratio between the shafts 86 and 97 to vary the rate of feed of the slide 10 and spindle 18.

The gearing of the reversing mechanism is preferably so proportioned that the speed of rotation imparted to the shaft 97 by the gear train connecting the gear 88 to the gear 104 is relatively slow and the speed of rotation imparted by the train of gears interposed between the gears 87 and 96 is relatively fast, the forward feed of the cutter spindle being effected by rotation of the shaft 97 through the gear 88 and the return movement of the cutter spindle being effected by driving the shaft 97 in the opposite direction from the gear 87, which rotates the shaft 97 at a much faster rate and causes the cutter spindle to be returned at a relatively rapid rate.

The shaft 97 has a threaded portion 105 which has threaded engagement with a bracket 106 carried by the slide 10 to move the slide along the front face of the housing 5 during operation of the machine.

A driving connection is also provided between the shaft 97 and the worm wheel 67 of the planetary gearing in order to properly correlate the linear and rotational movements of the cutter. At its end opposite to the gear 104 the shaft 97 has fixed thereto a gear 107 which meshes with a gear 108 on a shaft 109 to the outer end of which is attached a gear 110 meshing with a gear 111 on a countershaft 112, which also carries a gear 113 meshing with a gear 114 fixed to a shaft 115. A miter gear 116 is fixed to the inner end of the shaft 115 and this miter gear meshes with a miter gear 117 fixed to the inner end of a shaft 118 to which is fixed a worm 119 which meshes with the worm gear 67. During operation of the machine the shaft 97 is slowly driven at a uniform rate of speed such as to cause a slow feed movement of the spindle 18 toward the work, and the slowly rotating shaft 97 imparts a slow uniform turning movement to the worm gear 67 causing the planetary gears 65 and 68 to roll around the peripheries of the gears 64 and 69, thereby changing the speed ratio between the shafts 63 and 70 and varying the speed of rotation of the spindle 18 to compensate for the axial movement of the spindle and cutter. The gears 110, 111, 113 and 114 are change gears which can be readily replaced with gears of different sizes to establish a speed ratio between the shaft 97 and worm wheel 67 which will cause the cutter 16 to rotate at a speed such that, during the combined rotational and linear movements of the cutter, the cutting edges will remain in the surfaces of the teeth of an imaginary worm meshing with the worm wheel being generated and will correctly generate the worm wheel teeth.

*Work spindle operating mechanism*

As shown in Fig. 6 of the drawings, the work spindle 21 is provided with a suitable arbor clamping chuck 120 at its forward end and is mounted in a double ball bearing 121 in the front wall of the housing 2 and in a double ball bearing 122 in the rear wall of the housing 2. The ball bearing 121 is mounted in a cylindrical case 123 which fits in a bearing boss 124 formed in the front wall of the housing 2. The case 123 has a flange 125 at its forward end which engages in a counterbore in the boss 124 and at its rear end is provided with an inwardly projecting flange 126 against which the outer races of the ball bearing 121 are held. The bearing case 123 is held in place by a retaining ring 127 which is bolted to the outer end of the boss 124 and which overlies the outer end of the case 123 and holds the outer races of the ball bearing 121 against the flange 126. The inner races of the bearing 121 are clamped between the inner side of the chuck 120 and a clamping nut 128 in threaded engagement with the spindle inwardly of the bearing races. The work spindle as well as other shafts throughout the machine are mounted in ball bearings of the type known as initially loaded ball bearings which serve to eliminate end play. In such bearings, the inner races of a pair of adjacent ball bearings are made somewhat narrower than the outer races, and when axial clamping pressure is applied to these narrow inner races pressure is exerted upon the balls of the bearings in such a manner that axial play between the inner and outer races of the bearings is prevented. The double ball bearing 122 is mounted in a cylindrical case 129 mounted in a bearing boss 130 in the rear wall of the housing 2. The case 129 has an outwardly projecting flange 131 engaging in a counterbore in the outer end of the boss 130 and an inwardly extending flange 132 at its inner end for retaining the outer races of the bearings. The flange 131 of the bearing case 129 and the outer races of the ball bearing 122 are clamped by a housing 133 which encloses the worm wheel 57, the housing 133 being attached to the rear wall of the housing by means of bolts 133ᵃ.

The worm gear 57 has an elongated hub 134 splined to the rear end of the spindle 21 and clamped on the spindle by means of a nut 135 threaded on the rear end of the spindle. A spacing collar 136 is interposed between the inner end of the hub 134 and the inner races of the bearing 122 and a spacing collar 137 between the inner races of the bearing 122 and a shoulder on the spindle 21, so that the inner races of the bearings are clamped against the shoulder on the spindle 21 by tightening the nut 135.

The worm wheel housing 133 is provided with a flange plate cover 138 which has an outwardly projecting hub 139. This flange plate cover is clamped to the housing 133 by means of the screws 138ᵃ, the cover serving the purpose of retaining all oil inside the worm wheel housing.

The spindle 21 is readily removable through the front wall of the housing upon removal of the nut 135 and detaching of the retaining ring 127. The bearing case 123 is removable with the spindle and the reduced rear end of the spindle will pass through the bearing 122 mounted in the rear wall of the housing 2.

As best shown in Figs. 2, 5 and Figs. 7 to 14, a gear housing 140 is provided at one end of the housing 2 and this housing is provided with hinged doors 141 which afford access to the change gears within the housing. The entire gear train connecting the shaft 43 with the spindle driving shaft 55 is carried by the housing 140. When the housing 140 is in place on the end of the housing 2, some of the gears carried by the housing 140 are positioned within the housing 2 to permit ready insertion or removal of the housing with the gears carried thereby. The end of the housing 2 is provided with an opening 142 which is closed by the inner wall 143 of the housing 140.

As best shown in Fig. 11, the housing 140 is secured to the housing 2 by means of bolts 140ª extending through thickened portions of the wall 143 into the housing 2, and in order to accurately align the shafts carried by the housing with respect to shafts mounted in the housing 2, dowel pins 140ᵇ are provided adjacent the bolts 140ª, the dowel pins fitting in accurately machined openings in the housing.

As best shown in Fig. 12, the shaft 37 is mounted in a bearing boss 144 formed integrally with the rear wall 143 of the housing 140. As best shown in Fig. 7 the shaft 40 is mounted in a bearing boss 145 integral with the wall 143. As best shown in Fig. 13, the shaft 46 is mounted in a bearing boss 146 formed integrally with the wall 143.

As shown in Fig. 12, the shaft 37 is mounted in double ball bearings 147 and 148 at the inner and outer end of the boss 144. The inner races of the bearings 147 and 148 are spaced by a sleeve 149 fitting on the shaft 37 and the outer races of these bearings are spaced by a sleeve 150 fitting within the boss 144. The outer races of the bearings 147 and 148 are held between an outer cover plate 151, which covers the outer end of the shaft 37 and is provided with a recess 152 on the inner face thereof to accommodate the end of the shaft, and an inner cover plate 153 which is apertured to receive the shaft, the cover plates 151 and 153 being bolted to the outer and inner ends of the boss 144. The sprocket 36 has an elongated hub 154 splined to the inner end of the shaft 37 and extending into the aperture of the cover plate 153. This hub carries the gear 38 which may be formed integrally therewith and the sprocket 36 is clamped to the shaft 37 by means of a nut 155 threaded on the inner end of the shaft, the inner races of the bearings 147 and 148 being clamped under loading pressure between the hub 154 and an enlarged head 156 at the outer end of the shaft 37 by means of the nut 155.

As best shown in Fig. 7, the shaft 40 is mounted in double ball bearings 157 and 158 which are mounted in the bearing boss 145 at the inner and outer ends thereof, the inner races of the bearings 157 and 158 being spaced by means of a sleeve 159 fitting on the shaft, and the outer races being spaced by means of a sleeve 160 fitting within the bore of the bearing boss. The gear 39 is keyed to the inner end of the shaft 40 which is slightly enlarged, and is held in place by means of an integral head 161. The inner races of the ball bearings 157 and 158 are held under loading pressure by means of a clamping nut 162 which is threaded on the shaft 40, and which clamps the inner races of the bearings and the intermediate sleeve 159 against the shoulder at the inner end of the shaft. The outer races of the bearings 157 and 158 are held between the cover plates 151 and 153 which extend over the outer and inner ends of the boss 145.

As best shown in Fig. 13, the shaft 46 is journaled in ball bearings 163 and 164 at the inner and outer ends of the bearing boss 146, the bearing 163 being a single bearing and the bearing 164 being a double initially loaded bearing. The inner race of the bearing 163 is clamped against the shoulder of the shaft 46 by means of a clamping nut 165 and the double bearing 164 is mounted in a cylindrical bearing case 166 which fits within the outer end of the boss 146. The bearing case 166 has an inwardly extending flange 167 at its inner end to retain the outer races of the bearings and an outwardly extending flange 168 at its outer end which engages in a counterbore at the outer end of the boss 146. The outer races of the bearing 164 are held between the flange 167 and a cover plate 169 bolted to the outer end of the bearing boss 146, and the inner races of the bearing 164 are clamped under loading pressure against a shoulder on the shaft 46 by means of a clamping nut 170. The main shafts supporting the gears of the gear train carried by the housing 140 are thus rigidly supported in the rear wall 143 of the housing and carry gears at their inner and outer ends which can be quickly and easily attached after the shafts have been mounted.

As best shown in Fig. 7 of the drawings, the shaft 43 through which both the work spindle and cutter spindle are driven, is mounted at its outer end in a ball bearing 171 which is mounted in a boss 172 formed integrally with the rear wall 143 of the housing 140. The bearing 171 is a single bearing, the inner race of which is clamped against a shoulder on the shaft 43 by means of a clamping nut 173 threaded on the shaft 43. The inner end of the shaft 43 is mounted in a double initially loaded ball bearing 174 which is mounted in a bearing plate 175 detachably secured to a housing 176 which encloses the spindle 21. The outer races of the bearing 174 are seated in a counterbore formed on the inner side of the plate 175 and are held in place by means of a retaining ring 177 bolted to the inner face of the bearing plate. The spindle housing 176 extends from the front to the rear wall of the bed housing 2 and is formed integrally therewith and is further supported and reinforced by an additional web 178 extending to the base of the housing 2.

As best shown in Figs. 11 and 13, the shaft 49 carrying the gears 48 and 50, and the shaft 52 carrying the gears 51 and 53 are stub shafts mounted in an adjustable carrier plate 179 which is mounted for angular adjustment about the axis of the shaft 46.

As best shown in Fig. 13, the cover plate 169 at the outer end of the bearing boss 146 is provided with a cylindrical boss 180 concentric with the axis of the shaft 46 upon which the carrier plate 179 is pivoted.

As shown in Fig. 11, the carrier plate 179 is provided with an arcuate slot 181 whose center of curvature is located at the axis of the shaft 46 and the plate 179 is held in adjusted position by means of a clamping bolt 182 fixed to the inner wall of the housing 140 and extending through the slot 181. The gears 48, 50, 51 and 53 are change gears which may be replaced by gears of different sizes, gears 48 and 50 being retained by a nut 49ª on the outer end of the shaft 49, and the gears 51 and 53 being held in place by a nut 52ª on the outer end of the shaft 52. The gear 54 is also a change gear held in place by a nut 55ª on the outer end of the shaft 55, and to enable the above mentioned change gears to be replaced with gears of the proper sizes to give the desired speed ratio between the shafts 46 and 55 the carrier plate 179 may be adjusted to a position to accommodate such gears in the necessary intermeshing relation.

To remove the housing 140 with the gearing carried thereby it is simply necessary to remove the clamping bolts 140ª holding the housing to the frame, to remove the gear 42 which is held in place by a clamping nut 43ᵇ at the outer end of the shaft 43 and detach the sprocket chain 35 from the sprocket 36, the bearing boss 172 being formed to permit the housing to slide off the bearing of the shaft 43, when the housing 140 is detached from the main frame. The assembly of the shafts, bearings and gearing in the housing 140 when the housing is detached from the machine, is a very simple matter and each of the shafts is readily accessible for the removal of gears, bearings or other parts, and the replacement thereof.

As best shown in Fig. 14 of the drawings, the shaft 55 is mounted in a tubular housing 183 which extends from the housing 140 to the housing 133, the housing 133 having an opening 184 to receive the inner end of the housing 183. The housing 183 has a circumferential flange 185 which is bolted to the housing 133 at the margin of the opening 184, the wall of the housing 133 being thickened around the opening to receive the clamping bolts 185ᵃ. The outer end of the tubular housing 183 extends into an opening 185ᵇ in the lower portion of the housing 140 and has a sliding fit in a supporting ring 186 which is bolted to the inner wall 143 of the housing 140. The shaft 55 is journaled in an initially loaded double ball bearing 187 at the inner end of the housing 183, the inner races of the bearing 187 being clamped against a shoulder on the shaft 55 by means of a clamping nut 188. A lubricant retaining ring 189 is detachably secured to the inner end of the housing 183 and closely overlies the enlarged portion of the shaft 55 inwardly of the bearing 187. The shaft 55 is supported adjacent its outer end in a ball bearing 190 mounted in the outer end of the housing 183. The bearing 190 is a double ball bearing and has its inner races clamped under loading pressure between a shoulder on the shaft 55 and a clamping nut 191 threaded on the shaft 55, a spacing collar 192 being interposed between the shoulder of the shaft and the inner races of the bearing. The outer races of the bearing 190 are held between a retaining ring 193 bolted to the outer end of the housing 183 and an internal flange 194 of the housing.

The worm 56 is keyed upon a reduced portion 55ᵃ of the shaft 55 and is held in place on the shaft by a clamping nut 195. It will be apparent that the tubular housing 183 together with the shaft 55 may be readily removed from the housing 133 after the housing 140 is removed by removing the clamping nut 195 and unbolting the flanges 185.

*Turret mounting*

As best shown in Figs. 6, 7 and 8, the housing 2 has a flat top wall 196 which provides a bed for the turret 3. The turret 3 is provided at the base thereof with a forwardly projecting flange 197 to which is attached a pivot block 198, which fits in a central opening in the flange 197 and which has an enlarged head 199 which is bolted to the underside of the flange 197 and which fits within a circular opening in the wall 196. The turret 3 is mounted for angular adjustment through a small angle on the bed 196 about the axis of the pivot and may be clamped in adjusting position by means of clamping bolts 200 extending through short arcuate slot 200ᵃ in the flange 197, which permit the turret to be swung through a small angle when the clamping bolts 200 are loosened. The lower ends of clamping bolts 200 are threaded into thickened portions of the bed 196 and on top of the flange there is provided a clamping ring 201 which surrounds the pivot block 198 and bears upon the top face of the flange. At the upper ends of the bolts 200 nuts 202 are provided which may be screwed down tight against the clamping plate 201, to clamp the turret in adjusted position.

As best shown in Figs. 9 and 10, the turret 3 is provided with a base flange 203 at one corner of the frame which has an arcuate slot 204 formed therein which has its center of curvature at the pivotal axis of the turret. A clamping bolt 205 is fixed to the housing 2 and projects up through the slot 204, and this clamping bolt is adapted to be tightened on the flange 203 to clamp the turret in adjusted position. The outer edge of the flange 203 is provided with a graduated scale 206 preferably graduated in minutes and degrees, and the edge of the flange 203 is formed on a curve concentric with the slot 204. Outwardly of the flange 203 the corner of the housing 2 has a recess 207 formed therein in which is mounted a bearing block 208 which provides a support for two short vertical shafts 209 and 210. Shafts 209 and 210 have intermeshing spur gears 211 and 212 thereon and the outer of the shafts, 209, projects above the gear 211, being provided with a squared upper end 209ᵃ adapted to receive a suitable hand crank. Gear 212 meshes with a gear segment 213 fixed to the edge of the flange 203. When the clamping bolts are loosened the turret 3 may be adjusted to the desired angular position by means of a hand crank engaging the squared end 209ᵃ of the shaft 209. An angular cover plate 214 covers the gears 211 and 212 and has a curved inner edge provided with a graduated scale 215 contiguous to the outer edge of the flange 203. The scale 215 is flush with the scale 206 and is preferably graduated in minutes and degrees so that the angular position of the turret may be very accurately determined.

The purpose of the angular adjustment of the turret 3 is to enable the cutter spindle to be shifted angularly in either direction from a position perpendicular to the work spindle. This adjustment is desirable for the reason it affords means to compensate for the difference in the pitch line helix angles in oversize cutters. A new cutter is purposely made slightly larger than the cutter which it is intended shall mesh with the worm wheel. The pitch line helix angle of the cutter therefore is slightly less than the pitch line helix angle of the worm. This difference in the helix angle is compensated for by adjusting the turret 3 to the angle which represents the difference in the angles of helix of the worm and the worm-shaped cutter, measured on the pitch circle. The adjustment of the turret to this angle is in one direction when cutting a right hand worm wheel and in the opposite direction when cutting a left hand worm wheel.

*Cutter spindle operating mechanism*

As shown in Figs. 6 and 7 of the drawings, the shaft 60 has a reduced lower end journaled in ball bearings 216 and 217 mounted in counterbores in the upper and lower ends of the pivot block 198. The inner races of the bearings 216 and 217 are spaced by sleeve 218 fitting on the shaft 60 between the bearings and the inner races of the bearings are clamped between a shoulder on the shaft 60 and the hub of the gear 59 at the lower end of the shaft 60 by means of a nut 219 at the lower end of the shaft 60 which clamps the gear 59 against the inner race of the lower bearing 217. The outer races of the bearing 217 are held in a counterbore of the pivot block 198 by means of a retaining ring 220 bolted to the lower end of the block 198. Above the upper bearing 216 there is a lubricant retaining collar 221 fixed to the shaft 60 immediately above the pivot block 198.

As best shown in Figs. 6 and 21 the splined shaft 60 extends upwardly through the housing 5 which is provided with an opening 222 to receive the shaft. As shown in Fig. 21, the housing 5 is provided with transverse vertical webs 223 and 224 formed integrally with the walls thereof on opposite sides of the shaft 60 and adjacent thereto. Near the top of the housing 5 the webs 223 and 224 are joined by an integral horizontal web 225 which provides a support for the miter gear 61 which slides on the upper splined portion of the shaft 60. The gear 61 has an elongated hub 226 which extends through an opening 227 in the web 225 and is journaled in ball bearings 228 and 229 the outer races of which are seated in counterbores at the upper and lower ends of the opening. The inner races of bearings 228 and 229 are spaced by a sleeve 230 fitting on the hub 226 and are clamped under loading pressure against a shoulder on the inner face of the gear 61 by means of a clamping nut 231 threaded on the upper end of the hub 226.

The inner end of the horizontal shaft 63 in the housing 5 which is driven by the shaft 60 through the miter gears 61 and 62 and from which the cutter spindle and the cutter spindle feed mechanism are driven is journaled in a ball bearing 232 which is seated in a bearing boss 233 formed in the web 224 of the housing 5. The inner race of the bearing 232 is clamped between a shoulder on the shaft 63 and the hub of the miter gear 62 by means of a clamping nut 234 at the inner end of the shaft 63, which holds the gear 62 on the shaft. Near its outer end the shaft 63 is journaled in a double ball bearing 236 which is mounted in a bearing boss 237 formed in a transverse web 235 which is integral with the walls of the housing 5. The bearing boss 237 is counterbored from the outer side of the web to receive the outer races of the bearing 236 and these races are held in place by retaining ring 238 bolted to the outer face of the web 235. The inner races of the bearing 236 are clamped under loading pressure by means of a nut 239 threaded on the shaft 63 which clamps the inner races against a shoulder on the shaft.

As shown in Figs. 1, 15, 23 and 25, the gearing which forms a driving connection between the shaft 63 and the cutter spindle 18 is mounted in a housing 240 which is detachably secured to an end of the housing 5, the housing 240, having an integral extension 241 which encloses the worm wheel 78 in which the cutter spindle is splined. The gearing carried in the housing 240 is removable as a unit with the housing and may be assembled in the housing prior to the mounting of the housing 240 on the end of the housing 5. The housing 240 is attached to the end of the housing 5 by means of clamping bolts 240ª and dowel pins 240ᵇ which serve to accurately align the shafts in the housing 240 with the shafts mounted in the housing 5.

As best shown in Fig. 19, the housing 240 is provided with an integral partition 242 adjacent its outer end which provides a support for the shafts mounted in the housing, the change gears being mounted on the outer side of the partition and accessible from the end of the housing which is closed by a door 240ᵈ and the gears connecting the shaft with shafts mounted within the housing 5 being mounted on the inner ends of the shafts inwardly of the partition 242.

As best shown in Fig. 25, the shaft 70 which is axially aligned with the shaft 63 and driven from the shaft 63 through the planetary gearing carried by the worm wheel 67 is mounted in a bearing boss 243 formed integrally with the partition 242. The shaft 70 is journaled in inner and outer ball bearings 244 and 245, the inner races of which are spaced by a sleeve 246 fitting on the shaft 70, and the outer races of which are spaced by a sleeve 247 which fits within a bearing case 248 which is detachably mounted in the boss 243. The bearing case 248 is provided with a peripheral flange 249 at its outer end which is bolted to the outer end of the boss 243, and at the same end the bearing case is provided with an inwardly projecting flange 250 which provides a shoulder against which the outer race of the ball bearing 245 is seated. The flange 250 serves to retain lubricant in the bearing and is provided with a grooved inner edge closely overlying an enlargement 251 of the shaft 70. The outer races of the bearings 244 and 245 are held in the bearing case 248 by means of a retaining ring 252 bolted to the inner end of the bearing case 248 and the inner races of these bearings are clamped under loading pressure against the enlargement 251 on the shaft by means of a clamping nut 253 threaded on the shaft inwardly of the bearing. The shaft 70 projects outwardly beyond the bearing case 248 a sufficient distance to receive the gear 71 which is held in place on the shaft by means of a clamping nut 254. It will be apparent that the shaft 70 can be readily removed from the housing by detaching the gear 71 and the bolts clamping the bearing case 248 to the boss 243. The gear 71 and the gear 72 with which it meshes are change gears which can be readily removed and replaced with gears of different sizes, gear 72 being clamped to the outer end of its shaft 73 by means of a clamping nut 255.

The shaft 73 is mounted in a bearing case 256 which fits in an opening in the web 242 and which has a thick peripheral flange 257 engaging the inner face of the web 242. At its outer end the bearing case 256 has an inwardly projecting flange 258 which serves to retain lubricant in the bearing and which has a grooved inner end closely overlying an enlargement 259 on the shaft 73. The shaft 73 is journaled in ball bearings 260 and 261 mounted in the inner and outer ends of the bearing case 256, the inner races of the bearings being spaced by a sleeve 262 which fits on the shaft 73 between the bearings, and the outer races of the bearings being spaced by a sleeve 263 which fits within the bearing case 256 between the outer races. The outer races of the bearings 260 and 261 are clamped between the flange 258 at the outer end of the bearing case and a retaining ring 264 which is secured to the inner end of the bearing case by means of clamping bolts 265 which extend through the retaining ring flange 264 and have threaded engagement in the flange 257. The bearing case 256 is centralized in an aperture in the web 242 and fixed thereto by means of the clamping screws 265ª. It will be apparent that the shaft 73 can be assembled in its bearing case, and the bearing case attached to the web 242 prior to the mounting of the housing 240 on the end of the housing 5.

As shown in Fig. 16 of the drawings, the shaft 63 carries a double ball bearing 266 which is received in the inner end of the hub of the worm wheel 67. The inner races of the bearing 266 are clamped with initial loading pressure against the hub of the gear 64 which is held against a shoulder on the shaft 63 by means of a clamping nut 267 on the outer end of the shaft 63 which is positioned within the worm wheel 67. The inner end of the shaft 70 also extends into the hub of the worm wheel 67 and carries a double ball bearing 268 which is received in the outer end of the hub of the worm wheel 67. The inner races of the double ball bearing 268 are clamped under initial loading pressure against the hub of the gear 69 which bears against a shoulder on the shaft 70 by means of a nut 269 on the inner end of the shaft 70 which is positioned within the hub of the worm wheel 67. Since the shafts 63 and 70 are rigidly held against end play by initially loaded ball bearings in the housings 5 and 240, the worm wheel 67 supported on the adjacent ends of the shafts 63 and 70 will be positively held against axial play by the initially loaded ball bearings 266 and 268 secured to the ends of the shafts 63 and 70 and fitting in counterbores in the opposite ends of the hub of the worm wheel.

The shafts 66, which extend through the worm wheel and carry the planetary gears 65 and 68 are journaled in ball bearings 270 and 271, the outer races of which are seated in counterbores at the opposite sides of the worm wheel. The inner races of the bearings 270 and 271 are spaced by sleeves 272 which fit upon the shaft 66 between the bearings. One of the shafts 66 is provided with clamping nuts 273 at opposite ends thereof which clamp the hubs of the gears 65 and 68 against the inner races of the bearings 270 and 271 and apply a loading pressure to these bearings.

The bearings of the other of the shafts are clamped in a similar manner but a somewhat different mounting for the gear 65 is provided on this shaft. The second shaft 66 has a smooth enlarged portion 275 upon which the gear 65 is mounted and the gear 65 is keyed to the shaft by means of collar 276 which has keys 277 fitting in notches in the hub of the gear, the collar 276 being fixed to an integral head 278 at the inner end of the shaft by means of dowel pins 279. The mounting just described is for the purpose of providing a convenient means for accurately assembling the planetary gearing with the gears thereof in proper intermeshing relation. The keys on the shafts 63, 66 and 70 for the gears 64, 68 and 69 and one of the gears 65 are formed in the usual manner without regard to the angular position of the keys with respect to the teeth of the gears. In mounting the planetary gears 65 and 68 on the worm wheel 67, the shafts 66 with their gears 65 and 68 are assembled in mesh with the gears 64 and 69 as shown in Fig. 16 except that the collar 276 does not have the holes to receive the dowel pins 279. With the gears so assembled, the shaft is free to turn within the gear on the smooth end of the shaft 66, and the gears 64, 65, 68 and 69 will turn freely without binding action between the teeth thereof. The gear 65 on the smooth end 275 of the shaft 66 is brought to the position in which a tooth thereof is accurately centered between a pair of teeth of the gear 64 with which it meshes, the proper positions for the dowel pin openings in the collar 276 are then marked on the collar and the openings are drilled in the collar to receive the dowel pins 279. After the gears 65 and 68 of the planetary gearing have been properly positioned as above described for intermeshing engagement with the gears 64 and 69 the gears 64 and 69 may be removed and will readily slide into and out of intermeshing engagement with the gears 65 and 68. After the dowel pins 279 have been fitted to the collar 276 the inner races of the bearings 271 and 270 will be clamped under loading pressure by the nut 274 at the end of the shaft opposite the head 278 which draws the head 278 against the collar 276 and applies axial pressure to the bearings clamped between the gears 65 and 68.

In removing the housing 240 the shaft 70 with its gear 69 and bearing 268 can be moved outwardly away from the worm gear 67, since the gear 69 will slide out from between the gears 68 and the bearing 268 will slide out of the hub of the worm wheel, and in placing the housing 240 on the end of the housing 5 the gear 69 will slide into place between the gears 68 and the bearing 268 will slide into the counterbore of the worm gear. In assembling the planetary gearing with the shafts 63 and 70 in the machine the worm gear 67 can be first slipped onto the bearing 266 mounted on the end of the shaft 63 and the gears 65 will slip into mesh with the gear 64 on the shaft 63. The worm wheel will then be supported in position to receive the inner end of the shaft 70, the bearing 268 slipping into the counterbore at the outer side of the worm gear and the gear 69 moving axially into intermeshing engagement with the gears 68.

As best shown in Fig. 15, the shaft 76 which is driven through the miter gears 74 and 75 from the shaft 73 and which carries the worm 77 that drives the worm wheel 78 in which the cutter spindle is splined, is mounted in a tubular housing 280 which is provided with an extension portion 280ª journaled on the flange 257 between the web 242 and ring 264, and in addition is adjustably mounted in the housing 240, which is provided with a slot 281 in the front wall thereof to permit insertion and removal of the housing 280.

As best shown in Figs. 1 and 23 the extension 241 of the housing 240 has flanges 282 at the top thereof which extend along opposite sides of the opening 281 and which receive the tubular housing 280 between them, the housing 280 being secured to the flanges 282 by means of bolts 283, which pass through elongated slots in the flanges 282, permitting relative adjustment of the worm 77 and wheel 78.

As shown in Fig. 15 the shaft 76 is journaled in a ball bearing 284 mounted within the housing 280 at its inner end, and the inner race of this bearing is clamped against a shoulder on the shaft 76 by means of a nut 285 on the inner end of the shaft 76 which secures the miter gear 75 in place and presses the hub of said gear against the inner race of the bearing. A lubricant retaining ring 286 is attached to the inner end of the housing 280 and has a grooved inner edge closely overlying the hub of the miter gear 75. The outer end of the shaft 76 is journaled in a double ball bearing 287 which is mounted in the outer end of the housing 280, and the inner races of the bearing 287 are clamped under loading pressure by means of a nut 288 threaded on the shaft 76 outwardly of the bearing, and inwardly of the squared end 76ª thereof which projects beyond the end of the housing 280. A lubricant retaining cap 289 is attached to the outer end of the housing and has an internally grooved portion closely overlying a portion of the shaft outwardly of the screw threads upon which the nut 288 is mounted.

As best shown in Fig. 17 of the drawings, the elongated hub 79 of the worm wheel 78 is journaled in ball bearings 290 mounted in the extension 241 of the housing 240. The inner races of the bearings 290 are mounted upon the oppositely extending hub flanges and are seated against integral ribs 291 formed on the hub flanges, being clamped against said ribs by means of retaining rings 292 at the outer sides of the bearings and bolted to the hub. The outer races of the bearings 290 are mounted in rings 293 which fit within the extension 241 of the housing, the rings 293 being provided with inwardly projecting flanges 294 which provide shoulders against which the inner sides of the races are seated, and with outwardly projecting flanges 295 which provide shoulders for engaging the housing 241 to limit the inward movement of the rings. The rings 293 are clamped in the housing 241 by means of retaining rings 296 which are bolted to the opposite sides of the housing extension 241 and which project inwardly a sufficient distance to overlie the outer sides of the outer races of the bearings 290 to hold the same against the flanges 294.

An annular shield 297 is bolted to the retaining ring 296 at the inner side of the housing 241 and the inner edge of this shield closely overlies the grooved spindle drum 80 which is splined within the hub 79. An elongated cap 298 is bolted to the retaining ring 296 at the outer side of the housing 241 and this cap extends outwardly a sufficient distance to accommodate the axial movements of the cutter spindle.

The hub 79 of the worm gear 78 is splined to the grooves 80$^a$ in the drum 80 by means of adjustable gibs which, as best shown in Fig. 18, consists of side bearing members 299 which engage opposite sides of the grooves in the drum 80 and which are secured to the interior of the hub 79 by means of bolts 300. The bearing members 299 of each gib are pressed against the side walls of the groove by means of an adjustable wedge member 301 which is positioned between the bearing members 299 and which is radially adjustable by means of adjusting screws 302. By adjusting the wedge 301 the bearing members 299 may be maintained in close engagement with the walls of the groove so that there is no angular play between the spindle 18 and the worm wheel 78 by which it is driven, the bolts 300 having sufficient flexibility or sufficient play in the housing bolt holes to permit slight lateral movements to be imparted to the bearing members 299 by the screws 302.

As shown in Fig. 17, the spindle 18 is journaled in the bracket 12 formed integrally with the slide 10 and is rigidly held against axial play with respect to said bracket by means of initially loaded ball bearings 303 and 304, which are mounted in the bracket 12. The inner races of the bearings 303 and 304 are spaced by a sleeve 305 which fits on the spindle 18, and the outer races of these bearings are spaced by sleeve 306 which fits within the bearing opening of the bracket. The inner races of the bearings 303 and 304 are clamped under loading pressure by a nut 307 threaded on the spindle 18 and applying pressure to the inner races through a spacing collar 308 interposed between the inner race of the bearing 304 and the nut, the inner race of the bearing 303 being clamped against a shoulder 18$^a$ on the inner or forward end of the spindle. The outer races of the bearings 303 and 304 are clamped between retaining rings 309 and 310 which have grooved inner edges closely overlying the spindle 18 and the spacing collar 308.

The grooved drum 80 is fixedly secured by means of the key 80$^c$ to the spindle 18 and clamped thereto by means of a nut 80$^b$ at the outer end of the spindle. The spindle 18 is constrained to move with the slide 10 and is positively rotated by the worm wheel 78 through the adjustable gibs 299 which prevent any angular play between the spindle and worm wheel. The cutter spindle is very rigidly supported in the bracket 12, in the hub of the worm gear 78 and by the tailstock 14 so that the cutter 16 is positively driven with a minimum of vibration and with a minimum displacement from correct position due to the torsional stresses to which the cutter spindle is subjected during the cutting operation.

*Feed mechanism*

The mechanism for actuating the slide 10 to impart axial movements to the cutter spindle 18 is driven from the shaft 86, see Fig. 24, and is mounted in the housing 5 which has an end housing 311 detachably secured thereto, at the end opposite that to which the housing 240 is attached, in which the change gears of the reversing mechanism are mounted through which the screw shaft 97 is driven.

As best shown in Fig. 19, the lead screw shaft 97 projects into the housing 311 and is journaled in a double ball bearing 312 mounted in the housing 5 adjacent the housing 311, the bearing 312 being mounted in a bearing boss 313 formed in a web 314, which is formed integrally with the walls of the housing 5. Intermediate its ends the shaft 97 is journaled in a ball bearing 315 mounted in a bearing boss 316 formed in the integral transverse web 223 of the housing 5. The threaded portion 105 of the shaft 97 is disposed between the bearing 315 and the end of the shaft which projects into the housing 240 and engages in a threaded sleeve 317 secured in the bracket 106 attached to the slide 10. The shaft 97 is journaled at the end thereof adjacent the housing 240 in a ball bearing 318 which is mounted in a bearing boss 319 formed in a web 320 which is integral with the walls of the housing 5.

The inner races of bearings 312 are clamped under loading pressure by means of a clamping nut 321 threaded on the shaft 97 to press the races inwardly against a shoulder 97$^a$ on the shaft. The outer races of the bearing 312 are mounted in a counterbore in the outer end of the bearing boss 313 and are retained therein by a ring 322 bolted to the outer end of the boss 313. The inner race of the intermediate bearing 315 is clamped between the hub of the gear 96 against a shoulder 97$^b$ on the shaft 97 and a clamping nut 323 which is threaded on the shaft 97. The inner race of the bearing 318 is clamped between the hub of the gear 107 and a shoulder 97$^c$ on the shaft by means of a nut 324 at the end of the shaft which holds the gear 107 in place on the shaft.

The threaded sleeve or nut 317 extends through the bracket 106 having one end threaded for engagement with one side of the bracket and the other threaded to receive the clamping nut 325, and a lock nut 326, the sleeve 317 being held against turning movement in the bracket 106 by means of a key 327. Screw shaft 97 is thus very rigidly supported in the housing 5 and is held against end play in the housing by the initially loaded ball bearing 312.

As best shown in Fig. 26 of the drawings, the shaft 83 which carries the worm wheel 82 meshing with the worm 81 on the shaft 63 through which the feed mechanism is driven, is journaled in a double ball bearing 328 mounted in a bearing boss 329 formed integrally with the rear wall of the housing 5. The inner races of the ball bearings 328 are clamped under loading pressure against a shoulder 83ᵃ on the shaft 83 by means of a clamping nut 330 screwed onto the threaded outer end of the shaft 83. The outer races of the bearings 328 are seated in a counterbore formed in the bearing boss 329 and are held in the counterbore by means of a cover plate 331 which is bolted to the rear wall of the housing and covers the end of the shaft 83 and the bearings. The other end of the shaft 83 is journaled in a ball bearing 332 which is mounted in a web 333 formed integrally with the top wall of the housing 5. The miter gear 84 is mounted on the shaft 83 inwardly of the bearing 332. The inner race of the bearing 332, the hub of the miter gear 84 and the hub of the worm wheel 82 are clamped to the shaft 83 by means of a clamping nut 334 which presses these members against the shoulder 83ᵇ on the shaft 83.

As best shown in Fig. 24 of the drawings, the shaft 86 which carries the miter gear 85 meshing with the miter gear 84 on the shaft 83 projects through the web 224 of the housing 5 and carries the miter gear 85 at the end thereof immediately adjacent the web 224, the latter end of the shaft 86 being journaled in a ball bearing 335 mounted in the web 224, the inner race of the bearing 335 being clamped against a shoulder 86ᵃ on the shaft by the hub of the miter gear 85 which is held in place on the shaft and pressed against the bearing race by means of a clamping nut 336 on the inner end of the shaft 86. The shaft 86 has an intermediate bearing in the web 223 of the housing 5, being mounted in a ball bearing 337 which is positioned within a bearing boss 338 formed integrally with the web 223. The inner race of the bearing 337 is clamped against a shoulder 86ᵇ on the shaft 86 by means of a nut 339 threaded on the shaft. The outer end of the shaft 86 is journaled in a double ball bearing 340 mounted in a bearing case 341 which is rigidly secured by bolts 342 to an enlarged head 343 at the inner end of a short shaft 344 which is axially aligned with the shaft 86 and which forms an extension thereof. The outer races of the bearing 340 are seated in a counterbore in the bearing case 341 and are held in place by the head 343. The inner races of the bearing 340 are clamped under loading pressure by means of a nut 345 on the outer end of the shaft 86, a spacing sleeve 346 being interposed between the inner race of the bearing and a shoulder 86ᶜ on the shaft 86. The bearing case 341 is engaged by the shiftable clutch element 89 (Johnson Friction Clutch or equivalent) upon outward movement of the clutch element to lock the shaft 344 to the shaft 86 for rotation therewith, and upon inward movement of the shiftable clutch element 89, the gear 87 is engaged and locked to the shaft 86 for rotation therewith. The lead screw shaft 97 is driven in one direction by the train of gears connecting the gear 87 therewith and in the opposite direction by the train of gears in the housing 311 interposed between the gear 88 and the shaft 97 and driven by the gear 88. The shaft 344 is journaled in ball bearings 347 and 348 mounted in the inner and outer sides of a bearing member 349 which is detachably mounted by means of cap screws, not shown, in the transverse web 314 formed integrally with the walls of the housing 5 adjacent the end of the housing. The inner races of the bearings 347 and 348 are spaced by a sleeve 350 fitting on the shaft 344 between the bearings, and the inner races of the bearings are clamped under loading pressure against the enlarged head 343 of the shaft 344 by means of a clamping nut 351 threaded on the shaft 344. The housing 311 has an inner wall 353 which closes the end of the housing 5, and the outer end of the shaft 344 extends through a bearing boss 354 formed integrally with the wall 353 into the housing 311. The gear 88 is fixed to the end of the shaft 344 at the outer end thereof within the housing 311 and is held in place by a clamping nut 355. The gears connecting the gear 88 with the shaft 97 are feed change gears all mounted within the housing 311 and accessible through the door 352 which closes the outer side of the housing 311.

As best shown in Fig. 22 of the drawings, the housing 311 is provided with thickened portions having bolt apertures 356 and dowel apertures 357 so that the housing may be accurately aligned with the housing 5 in a manner similar to the housings 140 and 240. The shafts 99 and 102 carrying the change gears 98, 100, 101 and 103 are carried by an angularly adjustable carrier plate 358 which, as best shown in Fig. 24 is pivotally mounted on the bearing boss 354 to swing about the axis of the shaft 344. The carrier plate 358 is provided with an arcuate slot 359 which has its center of curvature at the pivotal axis of the carrier plate, and the carrier plate may be clamped in adjusted positions by means of a bolt 360 fixed to the wall 353 of the housing 311 and extending through the slot 359. The carrier plate 358 is also provided with elongated slots 361 and 362 in which the shafts 99 and 102 may be adjustably mounted. The shaft 99 may be mounted in either of the slots 361 or in the slots 362, as may be convenient for the particular sizes of gears carried by the shafts 99 and 102. The shaft 99 is clamped to the carrier plate and the gears 98 and 100 are secured thereon by means of a nut 363 at the outer end of the shaft and the shaft 102 is clamped to the carrier plate and the gears 103 and 101 are secured thereon by means of a nut 364 at its outer end, the shafts 99 and 102 being provided with heads 99ᵃ and 102ᵃ at their inner ends engaging the inner side of the carrier plate 358.

The lead screw shaft 97 is driven in a direction to feed the cutter spindle to the work through the change gearing in the housing 311 so that the rate of feed movement may be varied as desired by employing gears in said train of the proper relative sizes to provide the required gear ratio between the gear 88 on the extension 344 of the shaft 86 and the gear 104 on the shaft 97. The gearing connecting the gear 87 on the shaft 86 with the gear 96 on the shaft 97, see Fig. 19, drives the shaft 97 in a reverse direction to return the cutter spindle to its original position after the cutter has passed through the work, and this gearing is such as to drive the shaft 97, at a speed considerably higher than that at which the shaft 97 is driven through the feed change gears, so that little time is consumed in the return of the cutter spindle after the completion of the cutting operation.

*Spindle speed varying mechanism*

As previously explained, the work spindle is driven at a constant speed, and the generating cutting edges of the cutter while operating on the worm wheel blank remain in the surface of the teeth of an imaginary generating worm identical with the worm with which the worm wheel is to mesh. Assuming the imaginary worm to be stationary, it is apparent that if the cutter be moved axially with the cutting edges thereof remaining in the helicoid surfaces of the teeth of the imaginary worm, the cutter will have to have a turning movement simultaneously with its feed movement. If the imaginary worm be turning at a uniform speed the cutter will have to have a speed of rotation greater or less than that of the rotating imaginary worm during axial movement of the cutter in order to maintain the cutting edges in the helicoid surfaces of the teeth of the imaginary worm. In other words, the cutter must have a rotation corresponding to the algebraic sum of the speed of rotation of the imaginary worm and the speed of rotation of the axially moving cutter required to cause its cutting edges to travel in helicoid surfaces corresponding to the helicoid faces of the teeth of the imaginary worm. The variation of the speed of rotation of the cutter necessary to compensate for the axial feed movement thereof is directly proportional to the speed of axial movement, and this variation is accurately effected in the machine of the present invention by the driving connection between the shaft 97 and the planetary worm gear 67.

The gear train connecting the gear 107 on the shaft 97 with the worm gear 67 is mounted entirely in the housing 240, and as best shown in Fig. 19, the shaft 109 which carries the gear 108 meshing with the gear 107 on the shaft 97 is journaled adjacent its inner end in a double ball bearing 365, which is mounted in a web 366 formed integrally with the housing 240. The outer races of the bearings 365 are seated in a counterbore in the web 366 and are held in place by a retaining ring 367 bolted to the inner face of the web 366. The inner races of the bearings 365 are clamped under loading pressure against a shoulder 109$^a$ on the shaft 109 by means of a clamping nut 368 threaded on the shaft 109. The shaft 109 is journaled intermediate its end in a ball bearing 369, the inner race of which is clamped against a shoulder 109$^b$ of the shaft 109 by means of a clamping nut 370 threaded on the shaft, the bearing 369 being mounted in a bearing boss 371 formed integrally with the web 242 of the housing 240. A tubular bearing case 372 is bolted to the outer face of the bearing boss 371 and has mounted therein adjacent its outer end a ball bearing 373 in which the shaft 109 is journaled, the inner race of the bearing 373 being clamped against a shoulder 109$^c$ of the shaft 109 by means of a clamping nut 374 threaded on the shaft. The gear 110 is fixed to the shaft 109 beyond the outer end of the bearing case 372 and is held in place by a nut 375 threaded on the shaft inwardly of the squared outer end 109$^d$ thereof. The shaft 115 which is driven from the shaft 109 through the change gears 110, 111, 113 and 114 (see Fig. 23) is mounted in a tubular bearing case 376 which is mounted in the web 242 of the housing 240. The bearing case 376 has a flange 377 at its outer end which is bolted to the web 242 so that the bearing case with the shaft 115 may be removed bodily from the housing. The shaft 115 is journaled in inner and outer ball bearings 378 and 379 which are mounted within the bearing case 376 adjacent the inner and outer ends thereof, the inner races of the bearings being spaced by a sleeve 380 fitting on the shaft 115 between the bearings and the outer races being spaced by a sleeve 381 fitting the interior of the bearing case 376 between the outer races of the bearings. The shaft 115 is provided with an integral flange or rib 382 against which the inner race of the outer ball bearing 379 is seated, and the inner races of the bearings 378 and 379 are clamped under loading pressure by means of a nut 383 threaded on the shaft 115 adjacent the inner end thereof. The outer races of the bearings 378 and 379 are clamped between flange rings 384 and 385, which are bolted to the inner and outer ends of the bearing case 376.

As best shown in Fig. 23, the shaft 112 which carries the change gears 111 and 113 is mounted in an angularly adjustable carrier plate 386 which is mounted for angular adjustment about the axis of the shaft 115, being pivoted as shown in Fig. 19 on a projecting cylindrical boss 385$^a$ formed on the bearing retaining ring 385. As shown in Fig. 23, the carrier plate 386 has an arcuate slot 387 concentric with the pivotal axis of the carrier plate and may be secured in adjusted positions by means of a clamping bolt 388 secured to the web 242 of the housing 240 and projecting outwardly through the slot 387. The shaft 112 is adjustably mounted in an elongated slot 389 in the carrier plate to accommodate gears larger or smaller than the gears 111 and 113 shown in the drawings, and the shaft 112 is provided with a clamping nut 390 at its outer end which serves to clamp the shaft to the carrier plate and to retain the gears 111 and 113 on the shaft.

As best shown in Fig. 15 of the drawings, the shaft 118, which is driven from the shaft 115 through the miter gears 116 and 117, is journaled at its inner end in a ball bearing 391 which is mounted in a bearing boss 392 in a partition web 393 which is integral with the top and front walls of housing 240 and provides a chamber 394 for the miter gears 116 and 117 inwardly of the partition web 393. The shaft 118 carries the worm 119 which meshes with the worm wheel 67, the worm being splined to the shaft 118 and a spacer 395 being interposed between the inner end of the worm 119 and the inner race of the ball bearing 391. The inner race of the bearing 391 is clamped against the spacer 395 by means of a clamping nut 396 threaded on the inner end of the shaft 118. The outer end of the shaft 118 is journaled in a double ball bearing 397 which is mounted in a bearing boss 398 formed integrally in the rear wall of the housing 240, and the inner races of this double ball bearing are clamped under loading pressure against a shoulder 118$^a$ on the shaft 118 by means of a clamping nut 399 threaded on the outer end of the shaft 118. A cap plate 400 is bolted to the outer end of the bearing boss 398 and covers the bearing and the outer end of the shaft 118. The shaft 118, together with the bearing 397, may be removed through the rear wall of the housing upon removal of the cap plate 400 and the detachment of the miter gear 117 and clamping nut 396 from the inner end of the shaft which will permit the shaft to slide outwardly through the bearing 391, spacer 395 and worm 119.

The gearing just described imparts a rotation to the worm wheel 67 at a rate of speed proportional to the rate of rotation of the feed screw shaft 97 and to the rate of linear movement of the slide 10 and cutter spindle 18. By means of the change gears interposed between the shafts 109 and 115 this speed ratio may be varied as desired. Knowing the helix angle of the worm with which the worm gear is to mesh and the rate of linear movement of the cutter which is directly proportional to the rate of rotation of the shaft 97, the proper gear ratio of be established between the shaft 97, and the worm wheel 67, which will compensate for the linear movement of the cutter, and maintain the cutting edges in the helicoid surfaces of the teeth of the imaginary worm can be readily computed and this gear ratio may be established between the feed screw shaft 97 and the worm wheel 67 by providing gears of the proper relative sizes in the train of lead change gears in the housing 240 connecting the shafts 109 and 115, so that the linear feed of the cutter does not affect its correct generating action.

*Feed mechanism control*

The machine of the present invention is designed to completely cut and generate the teeth of a worm wheel in one pass of the cutter across the throated face of the worm wheel blank, and means is provided for lifting the housing 5 which supports the cutter spindle a sufficient distance, upon completion of the cutting stroke, to position the cutter clear of the finished worm wheel on the work spindle and to then reverse the direction of rotation of the lead screw shaft 97 to return the cutter to its starting position. This lifting, reversing, lowering and again advancing the cutter mechanism is preferably controlled automatically by the movement of the slide 10. The reversing clutch 89 may be advantageously effected by means of hydraulic cylinders, the hydraulic mechanism and the control devices therefor being illustrated diagrammatically in Fig. 27 of the drawings. As shown in Fig. 27, the clutch shifter lever 90 is operated by a hydraulic cylinder 401 which has pipes 402 and 403 communicating with the opposite ends thereof for supplying pressure to either end and simultaneously exhausting pressure from the opposite end of the cylinder to actuate the lever 90 and move the clutch member 89 either into clutching engagement with the gear 87 or with the gear 88. A pair of hydraulic cylinders 404 and 405 are mounted at the top of the turret 3 and pressure is supplied simultaneously to the upper or lower ends of these cylinders by the pipes 402 and 403 which communicate with said cylinders through cross pipes 406 and 407 to which the pipes 402 and 403 are connected. When pressure is supplied to cylinders 404 and 405 through the pipes 403 and 407 the pistons will be elevated to lift the housing 5. The pressure is exhausted from the cylinders 404 and 405 through the pipes 407 and 403 when the pressure is supplied to the top of the pistons 404 and 405, through the pipes 402 and 406, the housing will be lowered and the exhaust fluid will return to its reservoir in the pump 28. The pipes 402 and 403 are connected by pipes 408 and 409 to a pilot valve 410 which is connected by a pressure supply pipe 411 to a suitable source of fluid under pressure such as the pump 28, the valve 410 having an exhaust pipe 412 connected thereto which may extend to the reservoir of the pump 28. The pilot valve 410 is a valve of the well known plunger type, having a plunger 413 movable longitudinally therein, which in one position connects the pipe 409 with the pressure line 411 and the pipe 408 with the exhaust line 412, and in another position connects the pipe 408 with the pressure line 411 and the pipe 409 with the exhaust line 412. The pilot valve 410 is mounted in the housing 5 and its plunger 413 is actuated by an arm 414 fixed to a shaft 415 journaled in the housing 5 and projecting through the front wall thereof, a handle 416 being attached to the forward end of the shaft 415 by means of which the shaft may be actuated manually to operate the pilot valve. This handle 416 as shown in Fig. 1, is located at the front of the machine so that the operator can cause the cutter spindle to be instantly lifted to a position in which the cutter is clear of the work, which also causes the slide 10 to reverse its linear movement, at any time during operation of the machine if for any reason the operator desires to return the cutter to the starting point. The shaft 415 also has a depending arm 417 which projects into the path of trip lugs 418 and 419 which are mounted upon the top of the slide 10 for independent adjustment longitudinally of the slide. As shown in Fig. 6 of the drawings, the lugs 418 and 419 are mounted in a longitudinal T slot 10ᵃ in the top of the slide 10 and are clamped in adjusted position by means of clamping bolts 418ᵃ and 419ᵃ. The lug 418 engages the arm 417 upon the forward movement (left to right of observer) of the slide 10 after the cutter has passed across the face of the blank and actuates the arm 417 in the direction of the arrow 417ᵃ to move the plunger 413 downward into a position connecting the pipes 409, 403 and 407 to the pressure line 411 to supply pressure to the lower ends of cylinders 404 and 405 to elevate the housing 5 and at the same time to actuate the piston of the cylinder 401 in the direction of the arrow 401ᵃ to shift the clutch element 89 into engagement with the gear 87 which drives the lead screw shaft 97 in a direction to return the slide 10 to its starting position. The lug 419 engages with the arm 417 as the slide 10 approaches its starting position and moves the arm 417 in a reverse direction to that of the arrow 417ᵃ to supply pressure to the upper ends of the cylinders 404 and 405 and to the cylinder 401 to lower the housing 5, and simultaneously shift the clutch element 89 into engagement with the gear 88 to cause the slide 10 to again begin its forward cutting movement in the cycle of operation.

As best shown in Fig. 28, the pistons of the cylinders 404 and 405 have threaded rods 420 which are attached to the upper ends of vertical jack screws 421 mounted in the turret 3 adjacent to and on opposite sides of the pivotal axis of the turret and adjustably supporting the housing 5. The screws 421 have cylindrical splined upper ends 422 which have a splined key sliding fit in a supporting splined broached bracket 423 secured to the turret 3. Below the splined portion 422 the screws 421 have flanges 424 which limit the upward movement of the screws in the bracket 423. The upper splined ends 422 of the screws 421 have internally threaded bores 421ᵃ to receive the threaded piston rods 420 and, above the bracket 423, the threaded piston rods 420 have clamping nuts 425 threaded thereon, which are screwed into fixed engagement with the upper ends 421ᵇ of the jack screws 421 and locked into fixed position therewith by means of lock nuts 426 located above the clamping nuts 425. The nuts 425 each have a diameter greater than the cylindrical portion 422 of the jack screws so that these nuts serve to limit the downward movement of the screws with respect to the bracket 423. The housing 5 is supported by the screws 421, and is adjustably positioned thereon by means of brackets 427 fixed to the housing 5 carrying nuts 428 journaled in the brackets and in threaded engagement with the screws 421.

During the cycle of operation of the machine, while the cutter spindle is being fed in a forward direction across the blank, the screws 421 are pressed downward due to the hydraulic pressure on the piston rods 420. This downward movement is stopped when the flanged nut 425 abuts the fixed bracket 423, being thus supported thereby, and when so supported the flanges 424 are spaced a short distance below the under side of the bracket 423. When pressure is applied to the lower ends of the cylinders 404 and 405 the jack screws 421 are lifted bodily until the flanges 424 are brought into engagement with the bottom of the brackets 423, and this movement is sufficient to raise the cutter clear of the work, so that the cutter will not engage with the work while the slide 10 is being returned to its starting position.

Cutter spindle adjusting mechanism

As shown in Fig. 28, the nuts 428 have the form of an elongated internally threaded sleeve and are journaled in bushings 429 in the bracket 427. The nuts 428 have spiral gears 430 formed integrally therewith at their lower ends below the bracket 427 through which the nuts may be rotated and caused to move up or down on the screws 421. Thrust bearings 431 are interposed between the spiral gears 430 and the underside of the bracket 427, and the nuts 428 are secured in the bracket 427 by means of clamping nuts 432 threaded on the upper ends of the nuts 428 which bear against washers 433 interposed between the nuts 432 and the bracket 427.

As shown in Figs. 28 and 29, the spiral gears 430 may be driven by spiral gears 434 fixed to a horizontal shaft 435 mounted in the lower portion of the housing 5 adjacent the rear wall thereof. The shaft 435 projects through the housing 311 at the lower rear corner thereof and has a squared end 435ª adapted to be engaged by a suitable hand crank so that the nuts 428 carried by the gears 430 may be simultaneously turned to adjust the nuts upwardly or downwardly on the screws 421 to raise or lower the housing 5 so as to position the cutter spindle 18 at the proper radial distance from the axis of the work spindle 21 for the particular worm gear to be cut. The shaft 435 is journaled in bearing brackets 436 adjacent the gears 434, which are mounted between the brackets 436, are held in proper spaced relation by means of a spacing sleeve 437 fitting on the shaft 435 between the gears. The gears are held in place on the shaft 435 by means of a clamping nut 438 at the inner end of the shaft, the two gears and the inner races of the bearings 439 mounted in the brackets 436 being clamped between the nut 438 and a shoulder 435ᵇ on the shaft 435. At its outer end the shaft 435 is journaled in a double ball bearing 440 which is mounted in a thickened bearing portion 441 of the wall of the housing 311, and the inner races of the bearing 440 are clamped under loading pressure against a shoulder 435ᶜ on the shaft 435 by means of a clamping nut 442 threaded on the shaft inwardly of the squared end thereof. The outer races of the bearing are held in place in a counterbore in the thickened bearing portion 441 of the housing wall by means of a cap 443 bolted to the thickened portion 441 of the housing at the outer end thereof. A graduated disc 444 is fixed to the shaft 435 just outside the cap 443 and is held in place on the shaft by means of a set screw 445. As shown in Fig. 22, a zero mark 446 is formed on the outer face of the cap 443 immediately adjacent the periphery of the disc 444 and the marginal graduations of the disc serve to accurately indicate small angular movements imparted to the shaft 435, so that a fine adjustment of the cutter spindle 18 with respect to the work spindle 21 may be made by means of a suitable hand crank such as the crank 447 shown in Fig. 22.

Automatic motor control

As shown in Fig. 1 of the drawings, automatic circuit breaking switches 448 and 449 of a common and conventional type are mounted on the front face of the housing 5 in a position to be engaged by the slide 10 in its forward and rearward movements and serve to open the motor circuit and stop the driving motor 22 when engaged by the slide. The limit switch 448 is mounted in a position such that it will be slightly beyond the end of the slide 10 when the lug 418 engages the trip arm 417 controlling the lifting and reversing mechanism, and serves simply as a safety device to automatically stop the machine and prevent damage to the operating mechanism in case of failure of the hydraulic lifting and reversing mechanism above described. The limit switch 449 is engaged by the adjustably positioned switch abutment 449ª mounted in the T slot 10ª on slide 10 as it approaches its rearmost starting position just before the housing 5 is lowered to its cutting position, the limit switch is actuated by the abutment 449ª and serves to automatically stop the machine so that the finished worm wheel may be removed from the work spindle while the cutter 16 is up out of the way and a blank may be positioned on the work spindle ready to be cut.

The machine is provided with a push button station stopping and starting switch 450 provided with push buttons 451 of the usual and conventional type by which the motor circuit may be closed independently of the switch 449. Since the slide 10 must move a short distance from its starting position to clear the switch 449 and allow the same to close, it is necessary for the operator to hold the push button switch closed for a short time until the housing 5 is lowered by the hydraulic means to its cutter cutting position and until the slide 10 has moved a sufficient distance to release the switch 449. This requires the operator to stand for a time in front of the machine as it is starting where he can watch the initial operation of the machine to see that everything is functioning properly before the cutter comes into engagement with the work. An overload release mechanism of the conventional type is indicated at 452 in Fig. 28 and this mechanism, which serves to automatically stop the motor when it is subjected to an excessive load, is mounted within the turret 3 and is accessible through an opening in the rear wall of the turret which is closed by a door 3ª. The overload release mechanism may be so adjusted that it will serve to stop the motor before damage is done to any of the mechanism due to an overload.

Cutter lubrication

As shown in Fig. 1, a hose 453 extends from the outlet of the pump 33 and has a nozzle 454 supported by a clamp 455 in a position to direct a stream of cooling liquid upon the cutter as it engages the work. The clamp 455 is adjustably mounted on a vertical rod 456 which is slidably mounted on the tailstock 14 and held in adjusted position by a set screw 457. The base 1 of the machine extends forwardly a short distance beyond the front face of the housing 2 and provides a support for a wide drip pan and chip catcher 458 which is located directly beneath the worm wheel blank carried by the work spindle, and which is of a width sufficient to catch chips flying from the cutter as well as to collect the lubricating or cooling liquid dripping from the cutter and blank. The drip pan 458 is provided with a drain spout 459 which delivers into a receptacle 460 within the base 1, the opening in the bottom of the pan to the drain spout being covered by a screen 459ª which prevents the chips of metal from being carried through the spout to the receptacle. The liquid is delivered from the receptacle 460 through a filtering screen 461 and a feed pipe 462 to the inlet of the pump 33.

Modified form of cutter

Instead of a worm shaped cutter as shown in Fig. 1, I may employ a hobbing cutter, one type of which is disclosed in my copending application Serial No. 357,002, filed April 22, 1929 now Patent No. 1,873,158, issued August 23, 1932, this hob being provided with roughing teeth gradually increasing in width and height from the forward end toward the rear end of the cutter and being provided with finishing teeth at its rear end which are spaced axially from the roughing teeth. This hob is shown at 463 in Fig. 30, the roughing teeth being indicated at 464 and the finishing teeth at 465. The roughing teeth serve to cut the teeth of the worm wheel to nearly the correct form prior to the engagement of the finishing teeth therewith and the axial spacing of the finishing teeth is such that the cutting teeth are entirely out of engagement with the blank before the finishing teeth engage the blank. The cutter spindle is thus relieved of all torsional stresses when the finishing teeth come into operation, and since the finishing teeth take a very light cut, errors incident to the use of an ordinary hob, which are caused by slight angular movements of the cutter due to torsional stresses in the cutter spindle are eliminated.

Operation of the machine

In setting up the machine to generate a given worm wheel, the housing 5 is first adjusted for depth of cut in work by turning the shaft 435 to position the cutter spindle at exactly the proper distance above the axis of the work spindle. As hereinbefore explained, the cutters are preferably made slightly oversize and if the cutter is a new cutter the correct position for the cutter spindle will be slightly above the position which would be occupied by the conjugate worm meshing with the finished worm wheel in order to compensate for the slight excess in the diameter of the cutter in the plane of the cutting edges. A slight angular adjustment will also be made in the turret 3 by means of a hand crank applied to the squared end 209ª of the shaft 209 to turn the turret through the slight angle necessary to compensate for the difference in helix angle in the slightly oversize cutter and the worm which will ultimately mesh with the finished wheel. Charts may be provided showing the correct adjustments for the angular setting to compensate for the oversize cutters.

The index change gears in the housing 140 interposed between the shafts 46 and 55 are then interchanged to provide a gear ratio between the cutter spindle 21 and the work spindle 18 with the planetary gear 67 held stationary which corresponds exactly to the gear ratio between the worm wheel to be cut and its conjugate worm.

The proper feed gear ratio is then established through the change gears in the housing 311 interposed between the shaft 86 and the feed screw shaft 97 to establish a rate of axial feed for the cutter spindle such that the cutter 16 will have the proper uniform cutting action during its passage across the face of the blank. In general, the rate of feed, that is, the linear advance of the cutter for each revolution of the cutter is referred to in terms of linear movement. The magnitude of this depends upon the nature of the metal being cut. For a given worm wheel the highest rate of feed movement at which the cutter operates efficiently can be readily determined and the correct speeds for all sizes of worm wheels to be cut and for cutters of various sizes may be charted to assist operators in making the proper adjustments. After the proper rate of feed has been provided for the cutter spindle, which is usually between .001 inch and .010 inch, the proper gear ratio between the shaft 97 and the planetary gear 67 is established by means of the lead change gears in the housing 240 which are interposed between the shafts 109 and 115, so that the planetary gear carrier 67 will be rotated at exactly the proper speed. A chart may be provided to indicate correct gear lead ratios for worms of different leads.

In order to facilitate adjustment and to enable the operator to manually test various portions of the operating mechanism, and to set the cutter to the work, etc., the shafts 43, 76, 109 and 435 are provided with squared ends 43ª, 76ª, 109ª and 435ª which are readily accessible and which are adapted to receive a hand crank by means of which any one of these shafts may be turned manually to operate the mechanisms driven by these shafts.

After the cutter and worm wheel blank have been secured in place and the adjustments above described have been made, the operator starts the machine by pressing the push button 451 of the switch 450 and holding this switch closed until the machine is operated long enough to lower the housing 5 and to feed the slide 10 a sufficient distance to clear the switch 449. This requires the operator to stand in a position facing the machine during the initial operation thereof so that he can see whether or not the cutter is properly adjusted with respect to the blank as the cutter is approaching the face of the blank and to observe that the cutting fluid is flowing properly. This will enable the operator to detect anything unusual in the operation of the machine, which might be occasioned by an incorrect adjustment of the operating mechanism, before the cutter comes into engagement with the blank. If the operator finds that the machine is operating in a proper manner and that the necessary adjustments have been made, the operator releases the push button 451 as soon as the switch 449 is cleared by the slide 10. The machine then continues to operate and does not ordinarily require any attention on the part of the operator until the cutter has moved entirely across the face of the blank and the worm wheel has been completely cut, whereupon the trip lug 418 engages the trip arm 417, rocking the shaft 415 and actuating the plunger 413 of the pilot valve 410, causing pressure to be applied to the lower end of cylinders 404 and 405 to lift the housing 5 the short distance necessary to clear the cutter, and simultaneously applying pressure to the cylinder 401 to actuate the lever 90 in a direction to clutch the shiftable clutch element 89 with the gear 87 to drive the lead screw shaft 97 in a direction to return the slide and cutter spindle to its original position at a relatively rapid rate of speed. The reverse movement of the slide 10 continues until the lug 419 returns the trip arm 417 to very nearly its original position. At this point the limit switch is actuated to stop the machine. The machine stops before the pilot valve 410 is fully actuated; therefore, the fluid under pressure is trapped in the lower portion of the cylinders 404 and 405 and the housing 5 is held in its raised position. The pressure is released in the lower portion of the cylinders 404 and 405 as soon as the operator depresses push button 451 which starts the machine, whereupon the cycle of operation is repeated.

If a series of identical worm wheels are being cut all the operator has to do is to remove the finished worm wheel and replace it with a blank and restart the machine.

When a worn cutter is replaced with a sharp cutter, the slight angular adjustment of the turret 3 and the slight vertical adjustment of the housing 5 to insure the proper generating action with the new cutter may be quickly and easily made.

In Fig. 1 and other views of the machine, a right hand cutter 16 has been illustrated. When using a right hand cutter it will be necessary to rotate the shaft 17 in the direction indicated by the arrow 466. The work spindle 21 and the chuck 120 will therefore rotate in the direction of the arrow 467. This direction of rotation is provided for in the machine as described, since it is desirable to have the cutter and work rotate in such direction that the axial feed movement of the cutter, as indicated by the arrow 468, is at all times against or opposed to the peripheral movement of the work, so that the cutting forces set up will be constant and continually be in one direction which necessitates an acceleration of the cutter 16, which is accomplished by means of the planetary gear 67, shown in Fig. 15, and the planetary differential change gears 110, 111, 113 and 114; thus the cutter 16 screws itself across the face of the worm wheel in the direction of the arrow 468, as additionally hereinbefore referred to and described.

From the foregoing it is apparent that the cutter 16 must gain one revolution in addition to the number of revolutions it would have, which are normally based on the ratio between the number of threads or teeth in the cutter and the number of teeth in the worm wheel for a tangential feed movement of the cutter in the direction of the arrow 468, for a distance equal to the measure of the lead of a thread or tooth of the cutter. That is to say, if the lead of a thread or tooth of the cutter 16 is equal to four inches, the cutter must make one revolution during the tangential feed movement in the direction of the arrow 468, when the measure of this movement is exactly four inches. If the machine is at rest and the clutch worm 90, shown in Fig. 24, is placed in a neutral position to disengage the clutch 89, the operator may place a conventional hand crank similar to hand crank 447, shown in Fig. 22, on the end 109ᵈ of the shaft 109, see Figs. 19 and 23, and by rotating this shaft manually, the teeth of the cutter 16 will be caused to rotate, the slide 10 will be caused to move tangentially and the cutter teeth will begin to revolve and thread their way across the throat of the work and will make precisely one revolution when the slide 10 will have moved a distance of four inches.

To maintain the same conditions with a left hand cutter to produce a left hand worm wheel which will mesh with a left hand worm, it is only necessary to provide a left hand cutter 16 and to rotate the shaft 17 in the direction of the arrow indicated by the numeral 469. This is preferably accomplished by removing gears 71 and 72, see Figs. 23 and 23A, from the shafts 70 and 73, and substituting gears 470 and 471. The gear 470 will be mounted on the shaft 70 and the gear 471 will be mounted on the shaft 73 as heretofore described. The gears 71 and 72 have a ratio which is also equal to the ratio of the gears 470 and 471, but it will be observed that the gears 470 and 471 are smaller in diameter, which will permit the introduction of an idler gear 472 which is detachably mounted on a stub shaft 473 in the conventional manner by means of a nut 474, the stub shaft 473 being fixedly secured to the wall 242 of the housing 240, thus the shaft 73 is caused to rotate in the opposite direction, which in turn will cause the cutter spindle arbor 17 which carries the cutter 16 to rotate in the direction of the arrow indicated by the numeral 469. The stub shaft 473 is positioned in the wall 242 of the housing 240 relative to the position of the shafts 70 and 73, so that the idler gear 472, when journaled on said stub shaft 473, will mesh properly with the gears 470 and 471. Gears 71 and 72 are therefore to be positioned as shown in Fig. 23 when a right hand worm wheel is to be generated and are to be removed and gears 470, 471 and 472 substituted therefore when a left hand worm wheel is to be generated.

The automatic movements of the cutter 16 to complete the generation of the teeth of the work may be referred to as a cycle of operation. This cycle of operation is illustrated graphically by means of the diagram, Fig. 31, in which diagram it will be noted that the start and stop point is indicated by the numeral 475. The point at which the housing, carrying the cutter 16, begins to drop and also begins its forward cutting movement is indicated by the numeral 476. The point at which the operator will remove his finger from the push button 151 is indicated by the numeral 477. The point at the end of the forward cutting movement at which point the housing carrying the cutter begins to lift and reverses preparatory to its reverse or return movement to complete the cycle of operation is indicated by the numeral 478. The measure of the amount of lift of the cutter above the work is indicated by the numeral 479. The direction of movement is indicated by the arrows 480. By means of this diagram the cycle of movements may be very readily followed. The measure of the magnitude of the movement in each step of the cycle may be arranged to suit specific conditions of each job. In a practical operating machine such as the one herein disclosed the measure 479 is of such magnitude as will insure the teeth of the cutter clearing the teeth which it had previously generated in the work during its return or reverse movement. The measure of this is easily determined since machines are designed for given capacities and the measure of the movement 479, therefore, will be determined for the depth of tooth for the coarsest pitch worm wheel for which the machine has been designed. The measure of the forward cutting movement is determined as each job is presented, since this movement is not fixed in the machine but is adjustably controlled by the operator by positioning stops 418 and 419. The start and stop point 475 is also under the control of the operator by positioning the limit switch actuator 449a so that it will contact with the limit switch 449 at the desired point 475.

It has been found from practice that the proper position 475 is that position which will stop the machine just prior to the position at which the pilot stem valve 413 would actuate the valve within the cylinder of the pilot valve 410 to release the pressure from the lower portion of the cylinders 404 and 405 to that of the upper portion of said cylinders, which will thus prevent the housing 5 from dropping downward, so that when the machine is stopped by the limit switch the cutter 16 will be up out of the way, which will give the operator the maximum of room for loading and unloading the machine with a worm wheel blank. After the operator completes this operation he then depresses the starting push button 451, whereupon the reversed movement is completed and simultaneously the housing 5, carrying the cutter 16, is moved downward, and simultaneously with this movement, the clutch is actuated to move the slide 10 forward on the cutting movement. Because of the start and stop limit switch contacting at the point 475, it is desirable that the operator continue to depress the starting push button 451 until the point 477 is reached in the cycle of operation, at which point the operator may remove his finger from the starting push button and the machine will go through the cycle of operation as described.

It will be observed from the design of this machine, as illustrated in Fig. 1, that to facilitate loading and unloading the work spindle has been placed in the position which will be immediately in front of the operator when he stands facing the machine and this position is such that he can readily load and unload the machine with the minimum of exertion. In machines, however, having a capacity which would involve the handling of worm wheel blanks of more than one hundred pounds in weight, and which would necessitate the use of a crane, it would be preferable to arrange the work spindle 21 vertically. However, in worm wheels of one hundred pounds and less it is preferable, as contemplated by this invention, to arrange the work spindle as herein described.

It will be apparent that in the machine of the present invention all of the interchangeable gearing is mounted in housings which are readily accessible from the ends of the machine, that the housings which are detachably connected each carry a train of gearing which may be mounted therein prior to assembly of the housings and that the gearing units of the various housings are brought into operative relationship upon assembly of the housings. The mechanism mounted in the base 1 of the machine is made conveniently accessible by means of doors 1a in the base and all of the housings are so constructed that the parts carried thereby can be readily assembled therein prior to the assembly of the housings. Furthermore, the unit mounting of various parts of the operating mechanism in relatively movable housings makes possible the automatic control of the cycle of operations by means of very simple, positively actuated control devices.

Having thus described my invention, what I claim is:

1. In a machine of the character described, a supporting frame having a work spindle and a cutter spindle mounted thereon, means for simultaneously driving said spindles and for correlating their speeds of rotation, mechanism for slowly feeding the cutter spindle from a starting position transversely of the work spindle during rotation of the spindles in a plane spaced from the work spindle to cause a cutter on the cutter spindle to move tangentially across the face of a blank on the work spindle, and means controlled by the feeding means for automatically moving the cutter spindle radially away from the work spindle after a predetermined feed movement and for returning the cutter spindle to starting position.

2. In a machine of the character described, a supporting frame having a work spindle and a cutter spindle mounted thereon, means for simultaneously driving said spindles and for correlating their speeds of rotation, mechanism for slowly feeding the cutter spindle from a starting position transversely of the work spindle during rotation of the spindles in a plane spaced from the work spindle to cause a cutter on the cutter spindle to move tangentially across the face of a blank on the work spindle, means for automatically reversing said feed mechanism after a predetermined feed movement of the cutter spindle and for simultaneously shifting one of said spindles away from the other so that the cutter is clear of the work during the return movement of the cutter spindle, and means for automatically stopping the machine upon completion of the return movement.

3. In a machine of the character described, a supporting frame having a work spindle and a cutter spindle mounted thereon, means for simultaneously driving said spindles and for correlating their speeds of rotation, mechanism for slowly feeding the cutter spindle from a starting position transversely of the work spindle during rotation of the spindles in a plane spaced from the work spindle to cause a cutter on the cutter spindle to move tangentially across the face of a blank on the work spindle, means for automatically reversing said feed mechanism after a predetermined movement of the cutter spindle and for simultaneously moving the cutter spindle away from the work spindle a sufficient distance to bring the cutter to a position clear of the blank during the return movement, and means for shifting the cutter spindle toward the work spindle and for stopping the machine upon completion of the return movement.

4. In a machine of the character described, a supporting frame having a work spindle and a cutter spindle mounted thereon, means for simultaneously driving said spindles and for correlating their speeds of rotation, mechanism for slowly feeding the cutter spindle from a starting position transversely of the work spindle during rotation of the spindles in a plane spaced from the work spindle to cause a cutter on the cutter spindle to move tangentially across the face of a blank on the work spindle, means for automatically reversing said feed mechanism after a predetermined movement of the cutter spindle and for simultaneously moving the cutter spindle away from the work spindle a sufficient distance to bring the cutter to a position clear of the blank during the return movement, means for automatically stopping the machine upon a feed movement of the cutter spindle in excess of said predetermined feed movement due to failure of the automatic reversing means, and means for automatically stopping the machine on completion of the return movement of the cutter spindle.

5. In a machine of the character described, a supporting frame having a work spindle and a cutter spindle mounted thereon, means for simultaneously driving said spindles and for correlating their speeds of rotation, mechanism for slowly feeding the cutter spindle from a starting position transversely of the work spindle during rotation of the spindles in a plane spaced from the work spindle to cause a cutter on the cutter spindle to move tangentially across the face of a blank on the work spindle, and means controlled by the feeding means for automatically moving the cutter spindle radially away from the work spindle after a predetermined feed movement and for returning the work spindle to starting position at a speed which is relatively rapid as compared to the feed moevment.

6. In a machine of the character described, a supporting frame, a work spindle journaled in the frame, a cutter spindle carried by said frame and spaced radially with respect to the work spindle, said cutter spindle being disposed transversely with respect to the work spindle and mounted on the frame for axial movements and for movement bodily toward and away from the work sinpdle, a drive shaft, gearing interposed between said shaft and each of said spindles, means operated by said drive shaft for feeding said cutter spindle axially for a predetermined distance from a starting position, to cause a cutter on the cutter spindle to move across the face of a blank on the work spindle, and means controlled by said feeding means for automatically moving the cutter spindle bodily away from the work spindle a sufficient distance to bring the cutter to a position clear of the blank and for returning the cutter spindle to its starting position.

7. In a machine of the character described, a supporting frame, a work spindle journaled in the frame, a cutter spindle carried by said frame and spaced radially with respect to the work spindle, said cutter spindle being disposed transversely with respect to the work spindle and mounted on the frame for axial movements and for movement bodily toward and away from the work spindle, means for driving said spindles and for correlating their speeds of rotation, mechanism for slowly feeding said cutter spindle axially from a starting position for a predetermined distance sufficient to cause a cutter on the cutter spindle to move across the face of a blank on the work spindle, means for automatically shifting said cutter spindle bodily away from the work spindle upon completion of the feed movement, means for automatically reversing said fed mechanism to move the cutter axially in a reverse direction to return the same, means for automatically moving the cutter bodily to its starting position upon completion of the return movement, and means for automatically reversing the feed mechanism and stopping the machine with the cutter in its original starting position.

8. In a machine of the character described, a supporting frame, a work spindle journaled in said frame, a housing mounted on said frame for movements toward and away from the work spindle, a slide on said housing mounted for linear movement in a direction transverse to the work spindle, a cutter spindle carried by said slide, feed mechanism in said housing for moving the slide thereon, a drive shaft mounted in said frame, gearing for driving said spindles and said feed mechanism from said drive shaft, means for shifting said housing on said frame and for simultaneously reversing said feed mechanism, and means operated by said slide for controlling said housing shifting and feed reversing means.

9. In a machine of the character described, a supporting frame, a work spindle journaled in said frame, a housing mounted on said frame for movements toward and away from the work spindle, a slide on said housing mounted for linear movement in a direction transverse to the work spindle, a cutter spindle carried by said slide, a screw in said housing for imparting linear movements to said slide, means including reversing mechanism for driving said screw, means for driving the work and cutter spindles and for correlating their speeds of rotation, means operated by the slide for controlling said reversing mechanism whereby the forward and return movements of the slide are limited, and means controlled by said slide operating means for shifting said housing away from the work spindle at one limit of movement of the slide and toward the work spindle at the opposite limit of movement of the slide.

10. In a machine of the character described, a supporting frame, a work spindle journaled in said frame, a housing mounted on said frame for movements toward and away from the work spindle, a slide on said housing mounted for linear movement in a direction transverse to the work spindle, a cutter spindle carried by said slide, a screw in said housing for imparting linear movements to said slide, means including reversing mechanism for driving said screw, means for driving the work and cutter spindles and for correlating their speeds of rotation, means operated by the slide for controlling said reversing mechanism whereby the forward and return movements of the slide are limited, means controlled by said slide operating means for shifting said housing away from the work spindle at one limit of movement of the slide and toward the work spindle at the opposite limit of movement of the slide, and means for automatically stopping the machine upon completion of a forward and a return movement of the slide.

11. In a worm wheel generating machine, a supporting frame, a horizontally disposed work spindle journaled in the frame and projecting through the front wall of the frame, an elongated housing disposed transversely of the work spindle and mounted for vertical movement on the frame above the work spindle, said housing having a forwardly projecting portion at one end thereof, means for counterbalancing said housing, means for adjusting the housing on the frame, a slide mounted for longitudinal movement on said housing, a cutter spindle carried by the slide and disposed parallel to the direction of movement of the slide, a driving member rotatably mounted in the projecting portion of said housing, said driving member being coaxial with the cutter spindle and splined thereto, a screw in said housing for imparting linear movements to said slide, mechanism in said housing for driving said screw in either direction, means for imparting a limited vertical movement to said housing to lift the cutter spindle to a position in which a cutter on the cutter spindle is clear of a blank on the work spindle, means for driving the work and cutter spindles and said screw and for correlating their speeds of rotation, and means operated by said slide for controlling said feed mechanism to automatically reverse the direction of movement of the slide and for controlling the housing lifting means.

12. In a machine of the character described, a supporting frame, a horizontally disposed work spindle in the frame, an elongated housing mounted on the frame above the work spindle for vertical adjustment on the frame, said housing extending transversely of said work spindle, a slide mounted for longitudinal movement on said frame, a cutter spindle carried by said slide, means in said housing for imparting linear movements to said slide, means for driving said spindles and for correlating their speeds of rotation, means for vertically adjusting said housing on the frame including a vertical jack screw mounted in the frame, a nut rotatably mounted in the housing and movable vertically with the housing and means for rotating the nut to raise or lower the housing, and means for imparting a limited upward movement to the jack screw to impart a limited upward movement to the housing in any of its positions of vertical adjustment on the screw.

13. In a machine of the character described, a supporting frame, a horizontally disposed work spindle in the frame, an elongated housing mounted on the frame above the work spindle for vertical adjustment on the frame, said housing extending transversely of said work spindle, a slide mounted for longitudinal movement on said frame, a cutter spindle carried by said slide, means in said housing for imparting linear movements to said slide, means for driving said spindles and for correlating their speeds of rotation, means for vertically adjusting said housing on the frame including a vertical jack screw mounted in the frame, a nut rotatably mounted in the housing and movable vertically with the housing and means for rotating the nut to raise or lower the housing, and a hydraulic cylinder mounted on the frame and connected to said screw for imparting a limited upward movement thereto to impart a limited upward movement to the housing.

14. In a machine of the character described, a supporting frame, a horizontally disposed work spindle in the frame, an elongated housing mounted on the frame above the work spindle for vertical adjustment on the frame, said housing extending transversely of said work spindle, a slide mounted for longitudinal movement on said frame, a cutter spindle carried by said slide, means in said housing for imparting linear movements to said slide, means for driving said spindles and for correlating their speeds of rotation, means for vertically adjusting said housing on the frame including a vertical jack screw mounted in the frame, a nut rotatably mounted in the housing and movable vertically with the housing and means for rotating the nut to raise or lower the housing, a hydraulic cylinder mounted on the frame and connected to said screw for imparting a limited upward movement thereto to impart a limited upward movement to the housing, and means operated by said slide for controlling said hydraulic cylinder.

15. In a machine of the character described, a supporting frame, a horizontally disposed work spindle in the frame, an elongated housing mounted on the frame above the work spindle for vertical adjustment on the frame, said housing extending transversely of said work spindle, a slide mounted for longitudinal movement on said frame, a cutter spindle carried by said slide, means in said housing for imparting linear movements to said slide, means for driving said spindles and for correlating their speeds of rotation, means for vertically adjusting said housing on the frame including a vertical jack screw mounted in the frame, a nut rotatably mounted in the housing and movable vertically with the housing and means for rotating the nut to raise or lower the housing, means controlled by the slide for reversing its direction of movement, means also controlled by the slide for imparting a limited upward movement to said jack screw to lift the housing and hold the same in elevated position during the return movement of the slide, and means for automatically stopping the machine upon completion of its return movement.

16. In a machine of the character described, a supporting frame comprising a base housing having a flat top and a turret mounted on the flat top of said base housing for limited angular adjustment about a vertical axis, a horizontally disposed work spindle journaled in said base housing, an elongated horizontally disposed housing mounted for vertical adjustment on the turret and disposed transversely of the work spindle, a slide mounted for linear movement on said adjustable housing longitudinally thereof, a cutter spindle carried by said slide and disposed parallel to the line of travel of the slide, a housing attached to one end of said elongated housing and having a projecting portion into which an end of the cutter spindle extends, a driving member journaled in said projecting portion of the end housing and splined to the cutter spindle, a drive shaft journaled in said base housing, a vertical shaft mounted in the turret at the pivotal axis thereof, a horizontal shaft extending longitudinally of said housing and driven by said vertical shaft, a screw extending longitudinally of said elongated housing for actuating said slide, gearing connecting said drive shaft to the work spindle and to said vertical shaft, gearing in said end housing connecting said horizontal shaft with said spindle driving member, and gearing connecting said horizontal shaft with said screw.

17. In a machine of the character described, a supporting frame comprising a base housing having a flat top and a turret mounted on the flat top of said base housing for limited angular adjustment about a vertical axis, a horizontally disposed work spindle journaled in said base housing, an elongated horizontally disposed housing mounted for vertical adjustment on the turret and disposed transversely of the work spindle, a slide mounted for linear movement on said adjustable housing longitudinally thereof, a cutter spindle carried by said slide and disposed parallel to the line of travel of the slide, a housing attached to one end of said elongated housing and having a projecting portion into which an end of the cutter spindle extends, a driving member journaled in said projecting portion of the end housing and splined to the cutter spindle, a drive shaft journaled in said base housing, a vertical shaft mounted in the turret at the pivotal axis thereof, a horizontal shaft extending longitudinally of said housing and driven by said vertical shaft, a screw extending longitudinally of said shaft, a screw extending longitudinally of said elongated housing for actuating said slide, gearing connecting said drive shaft to the work spindle and to said vertical shaft, gearing in said end housing connecting said horizontal shaft with housing connecting said horizontal shaft with said spindle driving member, two trains of gearing interposed between said horizontal shaft and said screw, each including a gear rotatable on the horizontal shaft, one gear train serving to drive the screw in one direction and the other serving to drive the screw in the opposite direction, and a clutch element controlled by the slide for alternately connecting said gears to the horizontal shaft.

18. In a machine of the character described, a supporting frame comprising a base housing having a flat top and a turret mounted on the top of said base housing for limited angular adjustment about a vertical axis, horizontally disposed work spindle journaled in the base housing, a gear housing at one end of said base housing, a drive shaft journaled in the base housing, gearing, including change gears in said housing, for driving said work spindle, said housing together with the shafts and gears mounted therein being removable as a unit from the base housing, a housing mounted for vertical adjustment on said turret, a slide mounted for linear movement on said adjustable housing in a direction transverse to the work spindle, a cutter spindle mounted in said slide, mechanisms carried by said adjustable housing for actuating said slide and for driving said cutter spindle, and gearing connecting said drive shaft with said mechanisms to actuate the same.

19. In a machine of the character described, a supporting frame comprising a base housing having a flat top and a turret mounted on the top of said base housing for limited angular adjustment about a vertical axis, horizontally disposed work spindle journaled in the base housing, a gear housing at one end of said base housing, a drive shaft journaled in the base housing, gearing, including change gears in said housing, for driving said work spindle, a horizontally disposed elongated housing mounted for vertical adjustment on said turret and disposed transversely of the work spindle, a slide mounted for horizontal movement on said adjustable housing longitudinally thereof, a cutter spindle carried by said slide, gear housings mounted on the adjustable housing at opposite ends thereof, a screw mounted in said adjustable housing for actuating said slide, a vertical shaft mounted in the turret at the vertical axis thereof, gearing connecting said drive shaft to said vertical shaft, gearing, including change gears in the gear housing at one end of the adjustable housing, for driving the cutter spindle, and gearing, including change gears in the gear housing at the opposite end of the adjustable housing, for driving said screw.

20. In a machine of the character described, a supporting frame, having a work spindle and a cutter spindle mounted thereon, a slide supporting said cutter spindle mounted for movement transversely with respect to the work spindle to cause a cutter on the cutter spindle to move across the face of a blank on the work spindle, a reversible feed mechanism for operating said slide, means operated by the slide for acuating said reversing mechanism to cause said slide to move forwardlly a predetermined distance from a starting position and to be returned to starting position, means for automatically moving said slide a short distance radially away from the axis of the work spindle upon completion of its forward movement and for moving a slide corresponding distance radially toward the work spindle upon completion of the return movement thereof, and means for driving said spindles and feed mechanism and for correlating the speed of rotation of the cutter spindle to the speed of rotation of the work spindle and to the speed of linear movement of the slide.

21. In a machine of the character described, a supporting frame, having a work spindle and a cutter spindle mounted thereon, a slide supporting said cutter spindle mounted for movement transversely with respect to the work spindle to cause a cutter on the cutter spindle to move across the face of a blank on the work spindle, a reversible feed mechanism for operating said slide, means operated by the slide for actuating said reversing mechanism to cause said slide to move forwardly a predetermined distance from a starting position and to be returned to starting position, means for automatically moving said slide a short distance radially away from the axis of the work spindle upon completion of its forward movement and for moving the slide a corresponding distance radially toward the work spindle upon completion of the return movement thereof, means for driving said spindles and feed mechanism and for correlating the speed of rotation of the cutter spindle to the speed of rotation of the work spindle and to the speed of linear movement of the slide, and means for automatically stopping the machine upon return of the slide to its starting position.

22. In a machine of the character described, a supporting frame, having a work spindle and a cutter spindle mounted thereon, a slide supporting said cutter spindle mounted for movement transversely with respect to the work spindle to cause a cutter on the cutter spindle to move across the face of a blank on the work spindle, a reversible feed mechanism for operating said slide, means operated by the slide for actuating said reversing mechanism to cause said slide to move forwardly a predetermined distance from a starting position and to be returned to starting position, means for automatically moving said slide a short distance radially away from the axis of the work spindle upon completion of its forward movement and for moving the slide a corresponding distance radially toward the work spindle upon completion of the return movement thereof, means for driving said spindles and feed mechanism and for correlating the speed of rotation of the cutter spindle to the speed of rotation of the work spindle and to the speed of linear movement of the slide, and means for automatically stopping the machine upon movement of the slide past its forward reversing position due to failure of the reversing mechanism.

23. In a machine of the character described, a supporting frame, having a work spindle and a cutter spindle mounted thereon, a slide supporting said cutter spindle mounted for movement transversely with respect to the work spindle to cause a cutter on the cutter spindle to move across the face of a blank on the work spindle, a reversible feed mechanism for operating said slide, means operated by the slide for actuating said reversing mechanism to cause said slide to move forwardly a predetermined distance from a starting position and to be returned to starting position, means for automatically moving said slide a short distance radially away from the axis of the work spindle upon completion of its forward movement and for moving the slide a corresponding distance radially toward the work spindle upon completion of the return movement thereof, means for automatically stopping the machine upon return of the slide to its starting position, means for driving the work spindle, means for driving said feed mechanism, a planetary gearing having a gear driven from said work spindle driving means, a carrier, a second gear coaxial with the first and having a driving connection with the cutter spindle, and a gear carrier coaxial with said first mentioned gears and having gears thereon in mesh with said first mentioned gears, said carrier being driven by said feed mechanism.

24. In a machine of the character described, a supporting frame, a horizontal work spindle journaled in said frame, a housing mounted for vertical movements on the frame, a slide mounted on said housing for horizontal movements in a direction transverse to the work spindle, a screw in said housing for operating said slide, a shaft in said housing, two gear trains through which said screw may be driven from said shaft, one of said gear trains including change gears and the other being arranged to drive the screw in the direction opposite that in which it is driven by the first gear train, a clutch for alternately connecting said gear trains to said shaft, a cutter spindle carried by said slide, means for driving said spindles and said shaft and for correlating the speeds of rotation thereof, a hydraulic cylinder for actuating said clutch, and means controlled by said slide for supplying pressure to said cylinder to actuate the same.

25. In a machine of the character described, a supporting frame, a horizontal work spindle journaled in said frame, a housing mounted for vertical movements on the frame, a slide mounted on said housing for horizontal movements in a direction transverse to the work spindle, a screw in said housing for operating said slide, a shaft in said housing, two gear trains through which said screw may be driven from said shaft, one of said gear trains including change gears and the other being arranged to drive the screw in the direction opposite that in which it is driven by the first gear train, a clutch for alternately connecting said gear trains to said shaft, a cutter spindle carried by said slide, means for driving said spindles and said shaft and for correlating the speeds of rotation thereof, a hydraulic cylinder for actuating said clutch, a hydraulic cylinder for imparting a vertical movement to said housing, and a pilot valve operated by said slide for controlling the pressure in said cylinders to actuate the clutch and housing.

26. In a machine of the character described, a supporting frame, a horizontal work spindle journaled in said frame, a housing mounted for vertical movements on the frame, a slide mounted on said housing for horizontal movements in a direction transverse to the work spindle, a screw in said housing for operating said slide, a shaft in said housing, two gear trains through which said screw may be driven from said shaft, one of said gear trains including change gears and the other being arranged to drive the screw in the direction opposite that in which it is driven by the first gear train, a clutch for alternately connecting said gear trains to said shaft, a cutter spindle carried by said slide, means for driving said spindles and said shaft and for correlating the speeds of rotation thereof, a hydraulic cylinder for actuating said clutch, a hydraulic cylinder for imparting a vertical movement to said housing, a pilot valve for controlling the supply of pressure to said cylinders, an actuating member connected to said valve, and spaced lugs on said slide engageable with said actuating member.

27. In a machine of the character described, a supporting frame, a horizontal work spindle journaled in said frame, a housing mounted for vertical movements on the frame, a slide mounted on said housing for horizontal movements in a direction transverse to the work spindle, a screw in said housing for operating said slide, a shaft in said housing, two gear trains through which said screw may be driven from said shaft, one of said gear trains including change gears and the other being arranged to drive the screw in the direction opposite that in which it is driven by the first gear train, a clutch for alternately connecting said gear trains to said shaft, a cutter spindle carried by said slide, means for driving said spindles and said shaft and for correlating the speeds of rotation thereof, a hydraulic cylinder for actuating said clutch, a hydraulic cylinder for imparting a vertical movement to said housing, a pilot valve operated by said slide for controlling the pressure in said cylinders to actuate the clutch and housing, and means operated by the slide as it approaches one of its reversing positions for automatically stopping the machine.

28. In a machine of the character described, a supporting frame, a horizontal work spindle journaled in said frame, a housing mounted for vertical movements on the frame, a slide mounted on said housing for horizontal movements in a direction transverse to the work spindle, a screw in said housing for operating said slide, a shaft in said housing, two gear trains through which said screw may be driven from said shaft, one of said gear trains including change gears and the other being arranged to drive the screw in the direction opposite that in which it is driven by the first gear train, a clutch for alternately connecting said gear trains to said shaft, a cutter spindle carried by said slide, means for driving said spindles and said shaft and for correlating the speeds of rotation thereof, a hydraulic cylinder for actuating said clutch, a hydraulic cylinder for imparting a vertical movement to said housing, a pilot valve operated by said slide for controlling the pressure in said cylinders to actuate the clutch and housing, means operated by the slide as it approaches one of its reversing positions for automatically stopping the machine, and means operable by the slide upon movement past its opposite reversing position due to failure of the automatic reversing mechanism for automatically stopping the machine.

29. In a machine of the character described, a supporting frame, a work spindle journaled in said frame, a supporting member mounted on the frame for limited movements in a direction radial to the work spindle, a housing mounted on the supporting member for adjustments thereon in a direction radial with respect to the work spindle, a slide on said housing mounted for linear movements transversely of the work spindle, a cutter spindle on said slide, means for driving said spindles and for correlating their speeds of rotation, a reversible feed mechanism for operating said slide, means controlled by the slide for reversing said feed mechanism, and means controlled by the slide for shifting said supporting member away from the work spindle and toward the same.

30. In a machine of the character described, a supporting frame, a work spindle journaled in said frame, a supporting member mounted on the frame for limited movements in a direction radial to the work spindle, a housing mounted on the supporting member for adjustments thereon in a direction radial with respect to the work spindle, a slide on said housing mounted for linear movements transversely of the work spindle, a cutter spindle on said slide, means for driving said spindles and for correlating their speeds of rotation, a reversible feed mechanism for operating said slide, including a reversing clutch, a hydraulic cylinder for operating said clutch, a hydraulic cylinder for moving said supporting member on the frame, and means operated by the slide for controlling the supply of pressure to said cylinders.

31. In a machine of the character described, a supporting frame, a work spindle journaled in said frame, a supporting member mounted on the frame for limited movements in a direction radial to the work spindle, a housing mounted on the supporting member for adjustments thereon in a direction radial with respect to the work spindle, a slide on said housing mounted for linear movements transversely of the work spindle, a cutter spindle on said slide, means for driving said spindles and for correlating their speeds of rotation, a reversible feed mechanism for operating said slide, including a reversible clutch, a hydraulic cylinder for operating said clutch, a hydraulic cylinder for moving said supporting member on the frame, a pilot valve for controlling the supply of pressure to said cylinders, an actuating member operatively connected to said pilot valve, and spaced lugs on said slide engageable with said actuating member.

32. In a machine of the character described, a supporting frame, a work spindle journaled in said frame, a supporting member mounted on the frame for limited movements in a direction radial to the work spindle, a housing mounted on the supporting member for adjustments thereon in a direction radial with respect to the work spindle, a slide on said housing mounted for linear movements transversely of the work spindle, a cutter spindle on said slide, means for driving said spindles and for correlating their speeds of rotation, a reversible feed mechanism for operating said slide, means for shifting said supporting member, means for reversing said feed mechanism, and controlling means for said shifting and reversing means operated by the slide upon a predetermined movement thereof on the housing from a starting position, for reversing said feed mechanism and for causing said shifting means to move said supporting member away from the work spindle, said controlling means being operated by the slide upon completion of its return movement on the housing to again reverse the feed mechanism and to cause said shifting means to move the supporting member toward the work spindle to return the housing to its original position, and means for automatically stopping the machine with the slide in its original starting position.

33. In a machine of the character described, a supporting frame, a work spindle journaled in the frame, a slide carried by the frame and mounted for linear movement transversely of the work spindle, a cutter spindle carried by the slide, a reversible feed mechanism for operating said slide, means controlled by the slide for reversing said feed mechanism to cause said slide to travel transversely of the work spindle forwardly from a starting position and back to said starting position, means controlled by the slide for moving the cutter spindle radially away from the work spindle simultaneously with the reversal of movement of the slide at the forward end of its travel and for restoring the spindles to their original relative positions upon completion of the return movement of the slide, an electric motor and mechanisms connecting said motor with said spindles and feed mechanisms for driving the same and for correlating the speeds of rotation of the spindles and the speed of travel of the slide, and a normally closed motor controlling switch in the path of the slide for stopping said motor upon return of the slide to its starting position.

34. In a machine of the character described, a supporting frame, a work spindle journaled in the frame, a slide carried by the frame and mounted for linear movement transversely of the work spindle, a cutter spindle carried by the slide, a reversible feed mechanism for operating said slide, means controlled by the slide for reversing said means controlled by the slide to cause said slide to travel feed mechanism of the work spindle forwardly from transversely a starting position and back to said starting position, means controlled by the slide for moving the cutter spindle radially away from the work spindle simultaneously with the reversal of movement of the slide at the forward end of its travel and for restoring the spindles to their original relative positions upon completion of the return movement of the slide, an electric motor and mechanisms connecting said motor with said spindles and feed mechanism for driving the same and for correlating the speeds of rotation of the spindles and the speed of travel of the slide, a normally closed motor controlling switch in the path of the slide for stopping said motor upon return of the slide to its starting position, and a safety switch in the path of the slide for stopping the motor upon failure of the reversing mechanism.

35. In a machine of the character described, a supporting frame, a work spindle journaled in the frame, a slide carried by the frame and mounted for linear movement transversely of the work spindle, a cutter spindle carried by the slide, a reversible feed mechanism for operating said slide, means controlled by the slide for reversing slide, means controlled by the slide to cause said slide to travel said feed mechanism of the work spindle forwardly from transversely a starting position and back to said starting position, means controlled by the slide for moving the cutter spindle radially away from the work spindle simultaneously with the reversal of movement of the slide at the forward end of its travel and for restoring the spindles to their original relative positions upon completion of the return movement of the slide, an electric motor and mechanisms connecting said motor with said spindles and feed mechanisms for driving the same and for correlating the speeds of rotation of the spindles and the speed of travel of the slide, a normally closed motor controlling switch in the path of the slide for stopping said motor upon return of the slide to its starting position, a normally open motor starting switch for closing the motor circuit independently of the slide operated switch which must be held closed by the operator until the slide has been fed forwardly a sufficient distance to release the switch engaged thereby.

36. In a machine of the character described, a supporting frame, a work spindle journaled in the frame, a slide carried by the frame and having a cycle of movements comprising a predetermined forward linear feed movement from a starting position transversely of the work spindle, a movement radially away from the work spindle at the end of its forward movement, a return linear movement and a return radial movement to its starting position, a cutter spindle journaled in said slide, means for driving said spindles, means for imparting said cycle of movements to the slide, and means for stopping the machine upon completion of said cycle of movements of the slide.

37. In a machine of the character described, a supporting frame, a work spindle mounted in the frame, a housing mounted for adjustment on the frame, a housing detachably secured to one end of said adjustable housing, a slide on said housing, a cutter spindle carried by said slide, a feed screw mounted in the elongated housing for actuating said slide, a horizontal shaft in the elongated housing extending to the end thereof to which said detachable housing is attached, a second shaft in said detachable housing axially aligned with the first shaft, gears fixed to said shafts and spaced a short distance from the adjoining ends thereof, a planetary gear carrier mounted between said gears and rotatably mounted on the ends of said shafts, gears on said carrier meshing with the gears on said shafts, means for driving the work spindle and for driving said horizontal shaft at a speed which bears a fixed ratio to the speed of rotation of the work spindle, gearing connecting the last mentioned shaft with the feed screw, gearing connecting said planetary gear carrier with the feed screw, and gearing in said detachable housing connecting said second shaft to the cutter spindle.

38. In a machine of the character described, a supporting frame, a work spindle mounted in the frame, a housing mounted for adjustment on the frame, a housing detachably secured to one end of said adjustable housing, a slide on said housing, a cutter spindle carried by said slide, a feed screw mounted in the elongated housing for actuating said slide, a horizontal shaft in the elongated housing extending to the end thereof to which said detachable housing is attached, a second shaft in said detachable housing axially aligned with the first shaft, gears fixed to said shafts and spaced a short distance from the adjoining ends thereof, a planetary gear carrier mounted between said gears and rotatably mounted on the ends of said shafts, gears on said carrier meshing with the gears on said shafts, means for driving the work spindle and for driving said horizontal shaft at a speed which bears a fixed ratio to the speed of rotation of the work spindle, gearing, including change gears, connecting said horizontal shaft with the feed screw, and gearing, including change gears, connecting said second shaft with said cutter spindle.

39. In a machine of the character described, a supporting frame, a work spindle mounted in the frame, a housing mounted for adjustment on the frame, a housing detachably secured to one end of said adjustable housing, a slide on said housing, a cutter spindle carried by said slide, a feed screw mounted in the elongated housing for actuating said slide, a horizontal shaft in the elongated housing extending to the end thereof to which said detachable housing is attached, a second shaft in said detachable housing axially aligned with the first shaft, gears fixed to said shafts and spaced a short distance from the adjoining ends thereof, a planetary gear carrier mounted between said gears and rotatably mounted on the ends of said shafts, gears on said carrier meshing with the gears on said shafts, means for driving the work spindle and for driving said horizontal shaft at a speed which bears a fixed ratio to the speed of rotation of the work spindle, means for driving the said screw in either direction from said horizontal shaft, means for driving said planetary gear carrier from said screw at a speed which bears a fixed ratio of the screw, and means for driving the cutter spindle from said second shaft at a speed which bears a fixed ratio to the speed of rotation of said second shaft.

40. In a machine of the character described, a supporting frame, a work spindle mounted in the frame, a housing mounted for adjustment on the frame, a housing detachably secured to one end of said adjustable housing, a slide on said housing, a cutter spindle carried by said slide, a feed screw mounted in the elongated housing for actuating said slide, a horizontal shaft in the elongated housing extending to the end thereof to which said detachable housing is attached, a second shaft in said detachable housing axially aligned with the first shaft, gears fixed to said shafts and spaced a short distance from the adjoining ends thereof, a planetary gear carrier mounted between said gears and rotatably mounted on the ends of said shafts, gears on said carrier meshing with the gears on said shafts, means for driving the work spindle and for driving said horizontal shaft at a speed which bears a fixed ratio to the speed of rotation of the work spindle, means for driving the said screw in either direction from said horizontal shaft, means for driving said planetary gear carrier from said screw at a speed which bears a fixed ratio to the speed of rotation of the screw, and means for varying the speed ratios between the work spindle and horizontal shaft, between the horizontal shaft and screw and between said second shaft and cutter spindle.

41. In a machine of the character described, a base housing having a flat top, a work spindle journaled in said base housing and projecting through the front wall thereof, a turret mounted on the flat top of said base housing for angular adjustment about a vertical axis, said turret having a front face provided with vertical ways offset rearwardly with respect to said vertical axis, an elongated horizontally disposed housing mounted for vertical adjustment along said ways, a slide mounted for movement horizontally along the front face of said housing, a bearing bracket carried by the slide and projecting forwardly therefrom, a cutter spindle journaled in said bracket, mechanism in said adjustable housing for actuating said slide and driving the cutter spindle and for correlating the linear and rotational speeds of the slide and cutter spindle, a drive shaft in the base housing, gearing connecting said drive shaft with the work spindle, and gearing connecting said drive shaft with the mechanism in said adjustable housing.

42. In a machine of the character described, a base housing having a flat top, a work spindle journaled in said base housing and projecting through the front wall thereof, a turret mounted on the flat top of said base housing for angular adjustment about a vertical axis, said turret having a front face provided with vertical ways offset rearwardly with respect to said vertical axis, an elongated horizontally disposed housing mounted for vertical adjustment along said ways, a slide mounted for movement horizontally along the front face of said housing, a bearing bracket carried by the slide and projecting forwardly therefrom, a cutter spindle journaled in said bracket, and means for driving the spindles and actuating said slide and for correlating the speed of rotation of the cutter spindle to the speed of rotation of the work spindle and to the speed of linear movement of the slide.

43. In a machine of the character described, a base housing having a flat top, a work spindle journaled in said base housing and projecting through the front wall thereof, a turret mounted on the flat top of said base housing for angular adjustment about a vertical axis, said turret having a front face provided with vertical ways offset rearwardly with respect to said vertical axis, an elongated horizontally disposed housing mounted for vertical adjustment along said ways, a slide mounted for movement horizontally along the front face of said housing, a bearing bracket carried by the slide and projecting forwardly therefrom, a cutter spindle journaled in said bracket, a tailstock mounted for horizontal adjustment on the slide, a cutter carrying arbor attached to the spindle and interposed between the spindle and tailstock, means at the forward end of the work spindle for supporting a blank beneath said armor, and means for driving said spindles and for actuating said slide.

44. In a machine of the character described, a base housing having a flat top, a work spindle journaled in said base housing and projecting through the front wall thereof, a turret mounted on the flat top of said base housing for angular adjustment about a vertical axis, said turret having a front face provided with vertical ways offset rearwardly with respect to said vertical axis, an elongated horizontally disposed housing mounted for vertical adjustment along said ways, a slide mounted for movement horizontally along the front face of said housing, a bearing bracket carried by the slide and projecting forwardly therefrom, a cutter spindle journaled in said bracket, means for driving said spindles and for actuating said slide, means for counter-balancing said adjustable housing, and manually operable means for adjusting said housing vertically on said turret.

45. In a worm wheel generating machine, a base housing having a flat top, a work spindle journaled in said base housing and projecting through the front wall thereof, said spindle having means at its forward end for supporting a worm wheel blank, a turret mounted on said flat top for angular adjustment about a vertical axis, said turret having a front face provided with vertical ways and spaced rearwardly of the pivotal axis of the turret, an elongated horizontally disposed housing mounted for vertical adjustment on said ways, said housing having a forwardly extending portion at one end, a slide mounted on the front wall of said housing for linear movement longitudinally thereof, a forwardly extending bracket carried by the slide, a cutter spindle journaled in said bracket and extending into the forwardly extending portion of the adjustable housing, said cutter spindle being disposed parallel to the line of travel of said slide and being held against axial movements in said bracket, a driving member journaled in said forwardly extending portion of the housing and splined to said cutter spindle, mechanism in said adjustable housing for actuating said slide and for driving said cutter spindle driving member, a drive shaft in the base housing, gearing connecting said drive shaft with the mechanism in the adjustable housing, and gearing connecting said drive shaft with the work spindle.

46. In a worm wheel generating machine, a base housing having a flat top, a work spindle journaled in said base housing and projecting through the front wall thereof, said spindle having means at its forward end for supporting a worm wheel blank, a turret mounted on said flat top for angular adjustment about a vertical axis, said turret having a front face provided with vertical ways and spaced rearwardly of the pivotal axis of the turret, an elongated horizontally disposed housing mounted for vertical adjustment on said ways, said housing having a forwardly extending portion at one end, a slide mounted on the front wall of said housing for linear movement longitudinally thereof, a forwardly extending bracket carried by the slide, a cutter spindle journaled in said bracket and extending into the forwardly extending portion of the adjustable housing, said cutter spindle being disposed parallel to the line of travel of said slide and being held against axial movements in said bracket, a driving member journaled in said forwardly extending portion of the housing and splined to said cutter spindle, said spindle having an enlarged portion slidable in said driving member and provided with longitudinal grooves, gibs carried by said driving member and engaging in said grooves, said gibs being adjustable to closely fit the grooves and prevent angular play between the cutter spindle and its driving member, mechanism in said adjustable housing for actuating said slide and for driving said cutter spindle driving member, a drive shaft in the base housing, gearing connecting said drive shaft with the mechanism in the adjustable housing, and gearing connecting said drive shaft with the work spindle.

47. In a machine of the character described, a base housing having a flat top, a turret mounted on said top for angular adjustment about a vertical axis, said turret having a front face provided with vertical ways, a pair of hydraulic cylinders mounted on the top of said turret on opposite sides of said vertical axis, a vertically disposed jack screw suspended from the piston of each of said cylinders, an elongated horizontally disposed housing guided for vertical movement on said ways, nuts carried by the housing and threaded on said screws, a shaft mounted in said housing and geared to said nuts to adjust the housing on said screws, a slide mounted on said adjustable housing, a cutter spindle carried by said slide, a work spindle mounted in the base housing and having means for supporting a blank with its peripheral face in the line of travel of a cutter carried by the cutter spindle, means for driving the spindles and for imparting forward and return movements to the slide, and means controlled by the slide for admitting pressure to the lower ends of said cylinders to hold the cutter spindle supporting housing in an elevated position during the return movement of the slide.

48. In a machine of the character described, a supporting frame, a work spindle journaled in said frame, a supporting member mounted on the frame for limited movements in a direction radial to the work spindle, a housing mounted on the supporting member for adjustments thereon in a direction radial with respect to the work spindle, a slide on said housing mounted for linear movements transversely of the work spindle, a cutter spindle mounted on said slide, means for driving said spindles and for correlating their speeds of rotation, a reversible feed mechanism for operating said slide, including a reversing clutch, a hydraulic cylinder for operating said clutch, a hydraulic cylinder for moving said supporting member on the frame, and means for controlling the supply of pressure to said cylinders to simultaneously actuate said reversing clutch and shift said housing.

49. In a machine of the character described, a supporting frame, a work spindle journaled in said frame, a supporting member mounted on the frame for limited movements in a direction radial to the work spindle, a housing mounted on the supporting member for adjustments thereon in a direction radial with respect to the work spindle, a slide on said housing mounted for linear movements transversely of the work spindle, a cutter spindle on said slide, means for driving said spindles and for correlating their speeds of rotation, a reversible feed mechanism for operating said slide, including a reversing clutch, a hydraulic cylinder for operating said clutch, a hydraulic cylinder for moving said supporting member on the frame, and means including a manually operable lever on said adjustable housing for controlling the supply of pressure to said cylinders.

50. In a machine of the character described, a supporting frame, a work spindle journaled in said frame, a supporting member mounted on the frame for limited movements in a direction radial to the work spindle, a housing mounted on the supporting member for adjustments thereon in a direction radial with respect to the work spindle, a slide on said housing mounted for linear movements transversely of the work spindle, a cutter spindle on said slide, means for driving said spindles and for correlating their speeds of rotation, a reversible feed mechanism for operating said slide, including a reversing clutch, a hydraulic cylinder for operating said clutch, a hydraulic cylinder for moving said supporting member on the frame, a pilot valve for controlling the supply of pressure to said cylinders, an actuating member operatively connected to said pilot valve, spaced lugs on said slide engageable with said actuating member, and a hand lever at the front of the machine connected to said actuating member whereby said cylinders may be controlled manually.

51. In a machine of the character described, a supporting frame having a front face provided with vertical ways, an elongated horizontally disposed housing guided for vertical movement along said ways, a pair of laterally spaced vertically disposed hydraulic cylinders mounted on said frame, a pair of vertical jack screws attached to the pistons of said cylinders, nuts carried by said housing and threaded on said screws, means in said housing for simultaneously rotating said nuts to raise or lower the housing on said screws, a slide mounted on said housing for movement longitudinally thereof, a cutter spindle carried by said slide, a work spindle journaled in the frame and having means for supporting a blank with its peripheral face in the path of a cutter on the cutter spindle, means for driving the spindles and for imparting forward and return movements to the slides, and means for admitting pressure to said cylinders to shift the housing to a position in which the cutter is clear of the blank.

52. In a machine of the character described, a supporting frame, work supporting means carried by the frame, a housing mounted for vertical movement on the frame, a cutter carried by the housing for engagement with the work, means for vertically adjusting said housing including a vertical jack screw mounted in the frame, a nut rotatably mounted in the housing and movable vertically with the housing, means for rotating the nut to raise or lower the housing, and means for imparting a limited upward movement to the jack screw to impart a limited upward movement to the housing in any of its positions of vertical adjustment on the screw.

53. In a machine of the character described, a supporting frame, work supporting means carried by the frame, a housing mounted on the frame for vertical movement, a cutter carried by the housing for engagement with the work, means for vertically adjusting said housing on the frame including a vertical jack screw mounted in the frame, a nut rotatably mounted in the housing and movable vertically with the housing, and means for rotating the nut to raise or lower the housing, and a hydraulic cylinder mounted on the frame and connected with said screw for imparting a limited upward movement thereto to impart a limited upward movement to the housing.

54. In a machine of the character described, a supporting frame, work supporting means carried by the frame, a housing mounted for vertical movement on the frame, a cutter carrying slide mounted for movement on said housing, means for imparting linear movement to said slide, means for vertically adjusting said housing on the frame including a vertical jack screw mounted in the frame, a nut rotatably mounted in the housing and movable vertically with the housing, and means for rotating the nut to raise or lower the housing, a hydraulic cylinder mounted on the frame and connected to said screw for imparting a limited upward movement thereto to impart a limited upward movement to the housing, and means operated by said slide for controlling said hydraulic cylinder.

55. In a machine of the character described, a supporting frame, work supporting means carried by the frame, a housing mounted for vertical movement on the frame, a slide mounted for movement on the housing, a cutter carried by the slide for engagement with the work, means for imparting linear movement to said slide, means for vertically adjusting said housing on the frame including a vertical jack screw mounted in the frame, a nut rotatably mounted in the housing and movable vertically with the housing, and means for rotating the nut to raise or lower the housing, a hydraulic cylinder mounted on the frame and connected to said screw for imparting a limited upward movement thereto to impart a limited upward movement to the housing, means controlled by the slide for reversing its direction of movement, and means also controlled by the slide for imparting a limited upward movement to said jack screw to lift the housing and hold the same in elevated position during the return movement of the slide.

56. In a machine of the character described, a supporting frame, work supporting means carried by the frame, a housing mounted for vertical movement on the frame, a slide on said housing, a cutter carried by the slide for engagement with the work, means for imparting a linear movement to said slide, means for vertically adjusting said housing on the frame including a vertical jack screw mounted in the frame, a nut rotatably mounted in the housing and movable vertically with the housing and means for rotating the nut to raise or lower the housing, means operated by the slide for controlling the slide operating means to reverse the direction of movement of the slide, means also controlled by the slide for imparting a limited upward movement to said jack screw to lift the housing and hold the same in elevated position during the return movement of the slide, means for automatically stopping the machine upon completion of said return movement.

57. In a machine of the character described, a supporting frame, comprising a base housing having a flat top and a turret mounted on the top of said base housing for limited angular adjustment about a vertical axis, a horizontally disposed work spindle journalled in the base housing, a drive shaft journalled in the base housing, means for driving said work spindle from said shaft, a housing mounted for vertical adjustment upon said turret, a slide mounted for linear movement on said adjustable housing in a direction transverse to the work spindle, a cutter spindle mounted in said slide, mechanisms carried by said adjustable housing for actuating said slide and for driving said cutter spindle, and gearing connecting said drive shaft with said mechanisms to actuate the same.

58. In a machine of the character described, a supporting frame, a horizontal work spindle journalled in said frame, a housing mounted for vertical movement on the frame, a slide mounted on said housing for horizontal movement in a direction transverse to the work spindle, a screw in said housing for operating said slide, a shaft in said housing, two gear trains through which said screw may be driven from said shaft, one of said gear trains including change gears and the other being arranged to drive the screw in the direction opposite that in which it is driven by the first gear train, a clutch for alternately connecting said gear trains to said shaft, a cutter spindle carried by said slide, and means for driving said spindles and said shaft and for correlating the speeds of rotation thereof.

59. In a machine of the character described, a supporting frame, a horizontal work spindle journalled in said frame, a housing mounted for vertical movement on the frame, a slide mounted on said housing for horizontal movement in a direction transverse to the work spindle, a screw in said housing for operating said slide, a shaft in said housing, two gear trains through which said screw may be driven from said shaft, one of said gear trains being arranged to drive said screw in the direction opposite that in which it is driven by the other gear train and at a higher speed, a clutch for alternately connecting said gear trains to said shaft, a cutter spindle carried by the slide, and means for driving said spindles and said shaft and for correlating the speeds of rotation thereof.

60. In a machine of the character described, a supporting frame, a horizontally disposed work spindle in the frame, an elongated housing mounted on the frame above the work spindle for vertical adjustment on the frame, said housing extending transversely of said work spindle, a slide mounted for longitudinal movement on said frame, a cutter spindle carried by said slide, means in said housing for imparting linear movements to said slide, means for driving said spindles and for correlating their speeds of rotation, means for vertically adjusting said housing on the frame including a vertical jack screw mounted in the frame, a nut rotatably mounted in the housing and movable vertically with the housing and means for rotating the nut to raise or lower the housing, means controlled by the slide for reversing its direction of movement, and means also controlled by the slide for imparting a limited upward movement to said jack screw to lift the housing and hold the same in elevated position during the return movement of the slide.

OLIVER G. SIMMONS.